United States Patent [19]
de Possel

[11] 3,934,225
[45] Jan. 20, 1976

[54] SYSTEM FOR SCANNING AND IDENTIFYING STANDARDISED CHARACTERS AT HIGH SPEED

[76] Inventor: Rene de Possel, 55, avenue du Panorama, 92340 Bourg la Reine, France

[22] Filed: Jan. 15, 1974

[21] Appl. No.: 433,438

[30] Foreign Application Priority Data
Jan. 19, 1973 France .............................. 73.01923

[52] U.S. Cl. ................ 340/146.3 J; 340/146.3 MA
[51] Int. Cl.² ........................................ G06K 9/12
[58] Field of Search........... 340/146.3 R, 146.3 MA, 340/146.3 J, 146.3 AC, 146.3 Y, 146.3 AQ

[56] References Cited
UNITED STATES PATENTS
3,346,845  10/1967  Fomenko ..................... 340/146.3 Y Primary Examiner—Leo H. Boudreau

[57] ABSTRACT

This invention relates to a system for scanning and identifying characters in a document carrying a text made up of equidistant parallel lines of equal length placed one below another, some lines possibly being blank. The system includes means for scanning the text in successive transverse sweeps during each of which a transverse band covering a small number of lines of writing is scanned. The document is movable relative to the fixed position of the band so that, between one transverse sweep and the next, each line of writing comes into substantially the same position as the line before. Each band is itself scanned at a frequency T in J equidistant columns, each of said columns being divided into a number N of small areas which form a line. The said scanning means supplies N electrical signals formed by a "0" or a "1" which correspond respectively to the whites and blacks and vice versa in the text.

10 Claims, 41 Drawing Figures

| | $G^3$ CENTRAL COLUMN | | $G^5$ RIGHT-HAND EDGE | | | $G^4$ 3/4 WIDTH | | |
|---|---|---|---|---|---|---|---|---|
| | | T | | L U | $nd_1 \leq 11$ | HMN | $b_{3/4,1} \leq 11$ | M |
| $nm_2 = 0$ | $bm_1 \leq 4$ | | | | $nd_1 > 11$ | | $b_{3/4,2} \leq 14$ | N |
| | $bm_1 > 4$ | HMNWX | | HMN | | | $b_{3/4,2} > 14$ | H |
| | | Y | | | | | $b_{3/4,2} \leq 14$ | $Q_{21}$ |
| | $nm_1 \leq 12$ | | | COQ | $nd_2 = 0$ | OQ$_1$ | $n_{3/4,3} = 0$ | O |
| | $nm_1 > 12$ | | | | $nd_2 > 0$ | | $b_{3/4,2} > 14$ | $Q_{31}$ |
| | $bm_1 \leq 25$ | V | | | | | $n_{3/4,3} > 0$ | |
| | $bm_1 > 25$ | JLU | | | $nd_2 = 0$ | $Q_2$ | | |
| $nm_2 > 0$ | $bm_2 \leq 8$ | AK4 | | | $bd_2 \leq 10$ | C | | 8 |
| | $bm_2 < 8$ $bm_3 \leq 13$ | FPR | G 6,8 | | $bd_2 > 10$ | $6_1 8_1$ | $b_{3/4,2} \leq 9$ | G |
| | $bm_3 > 13$ | 7 | | | | $G_1 8_2$ | $b_{3/4,2} > 9$ | $6_1 8_1$ |
| | $nm_3 = 0$ | | | $_1 S$ 9 | $bd_1 \leq 13$ | 9 | | |
| | $nm_2 \geq 8$ | | | | $bd_1 > 13$ | $_1S_1$ | $G^2$ 1/4 WIDTH | |
| $nm_2 \geq 0$ | | CDOQ | | | $nd_2 = 0$ | $_1S_2$ | $6_1 8_1$ | $n_{1/4,1} \leq 8$ | $n_{1/4,3} > 5$ | $_16$ |
| | $nm_3 > 0$ | BEGSZ 235689 | | FPR | $nd_2 = 0$ | F | | $n_{1/4,3} \leq 5$ | $_18_1$ |
| | | | | | $nd_2 > 0$ | P | $n_{1/4,1} > 8$ | | $_26$ |
| | | | | | $nd_2 = 0$ | R | | |
| | $G^1$ LEFT-HAND EDGE | | | BE | $bd_e \leq 14$ | $B_1$ | | |
| | | LU | | | $bd_e > 14$ | E | | |
| JLU | $bg_1 \leq 12$ | | | | | 3 | | |
| | $bg_1 > 12$ | J | | Z 3 | $bd_2 \leq 16$ | Z | | |
| | $ng_2 = 0$ | W | | | $bd_2 > 16$ | | | |
| HMN WX | $ng_1 \leq 22$ | HMN | | | $nd_2 = 0$ | $_28_1$ | | |
| | $ng_1 > 22$ | | | $2_18$ | $nd_2 > 0$ | 2 | | |
| | $ng_2 > 0$ | X | | | | $_28_2$ | | |
| FPR AK4 | $ng_2 = 0$ | FPR | | | | | | |
| | | K | | | | | | |
| | $bg_1 \leq 7$ | A | | | | | | |
| | $bg_1 > 7$ | 4 | | | | | | |
| | $ng_2 > 0$ | A | | | | | | |
| CDOQ | $ng_1 \leq 22$ | | | | | | | |
| | $ng_1 > 22$ | COQ | | | | | | |
| BEGSZ 235689 | $ng_2 = 0$ | D | | | | | | |
| | | G 6,8 | | | | | | |
| | $ng_1 \leq 26$ | $bg_2 \leq 14$ | | | | | | |
| | | $bg_2 > 14$ | $_1S9$ | | | | | |
| | $ng_1 > 26$ | | BE | | | | | |
| | $ng_1 \leq 12$ | $bg_2 \leq 16$ | $ng_2 \leq 5$ | $_2S$ | | | | | |
| | | | $ng_2 > 5$ | 2,8 | | | | | |
| | $ng_2 > 0$ | $bg_2 > 16$ | | Z,3 | | | | | |
| | $ng_1 > 12$ | | | 5 | | | | |

Fig.2

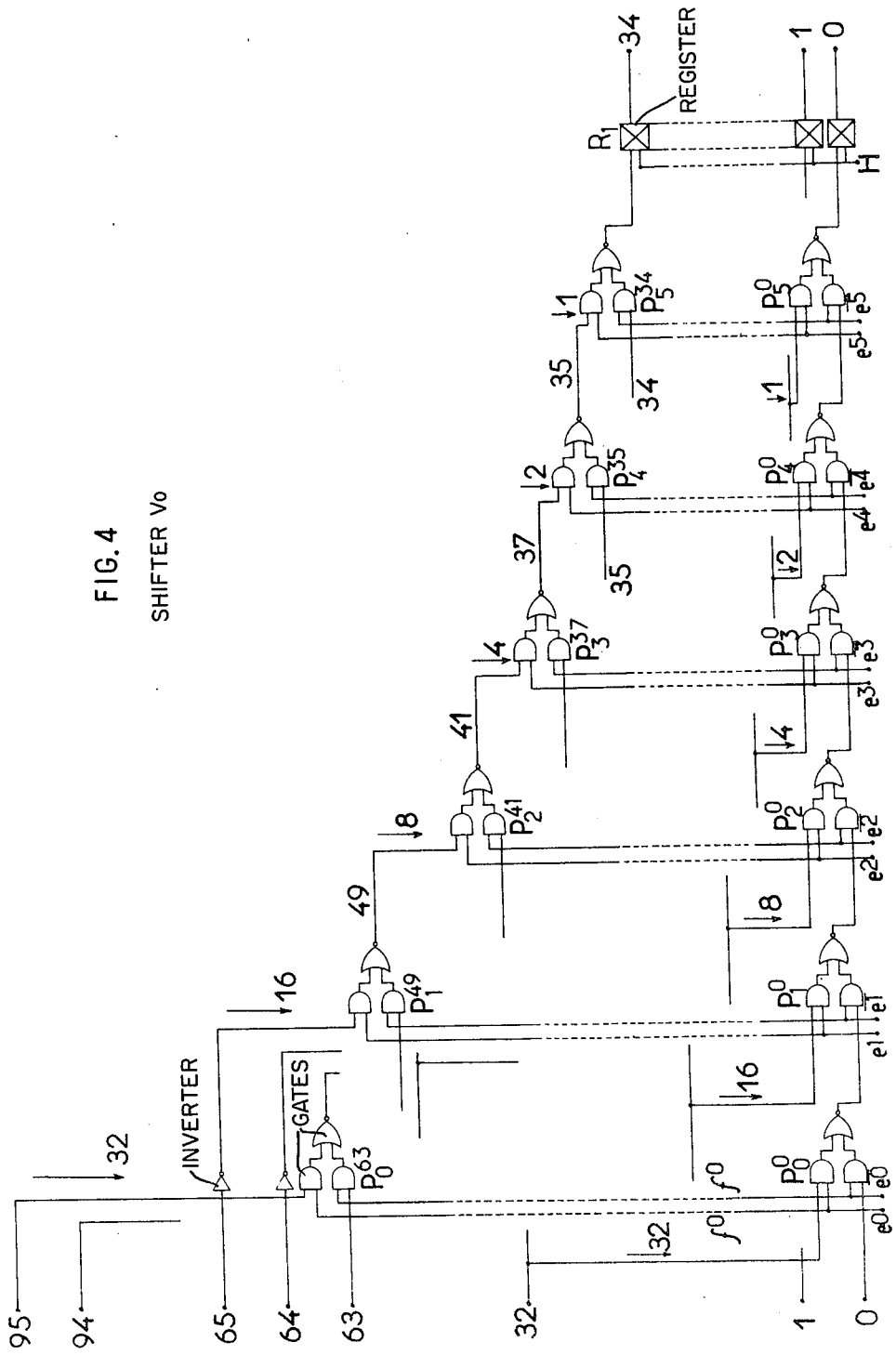

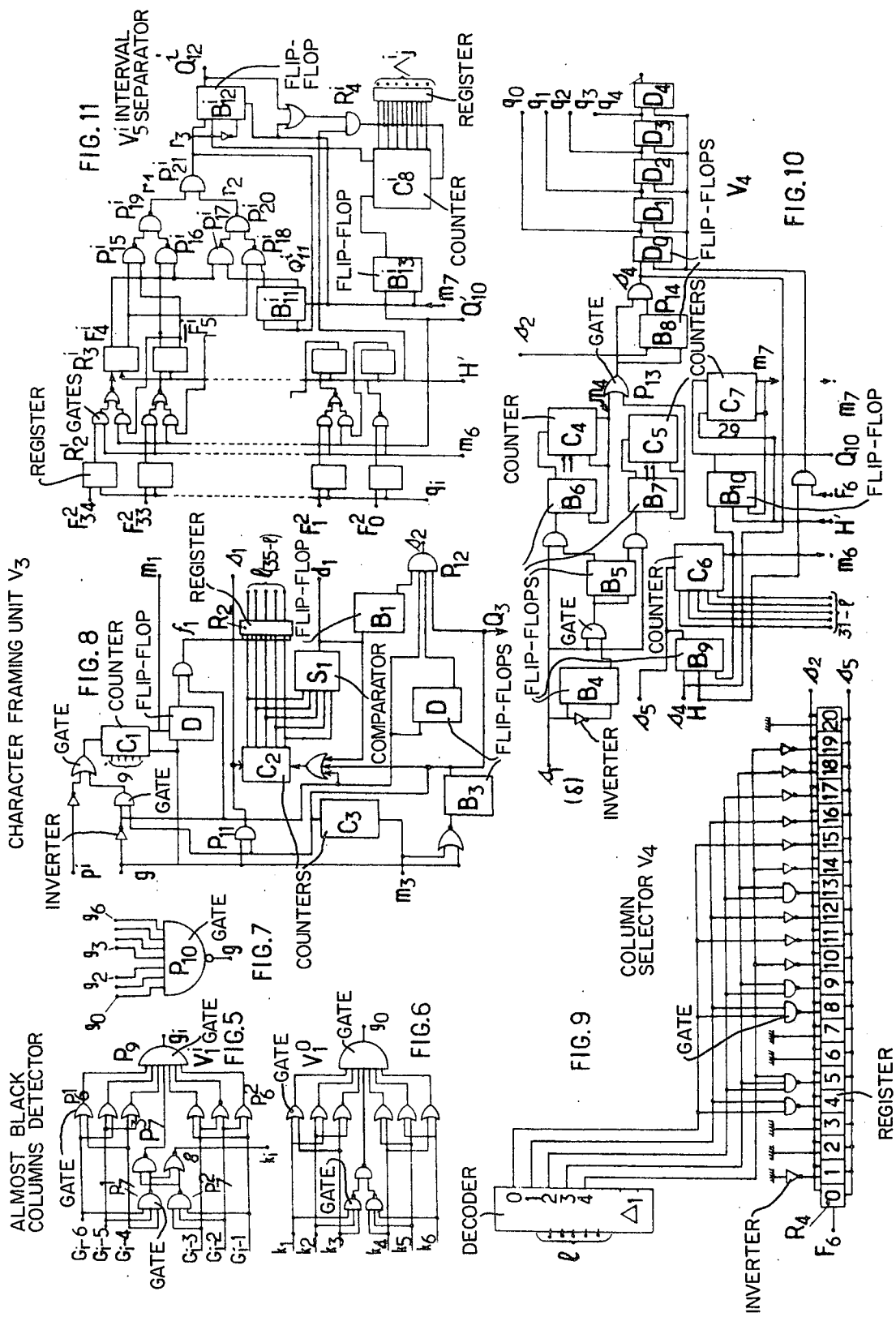

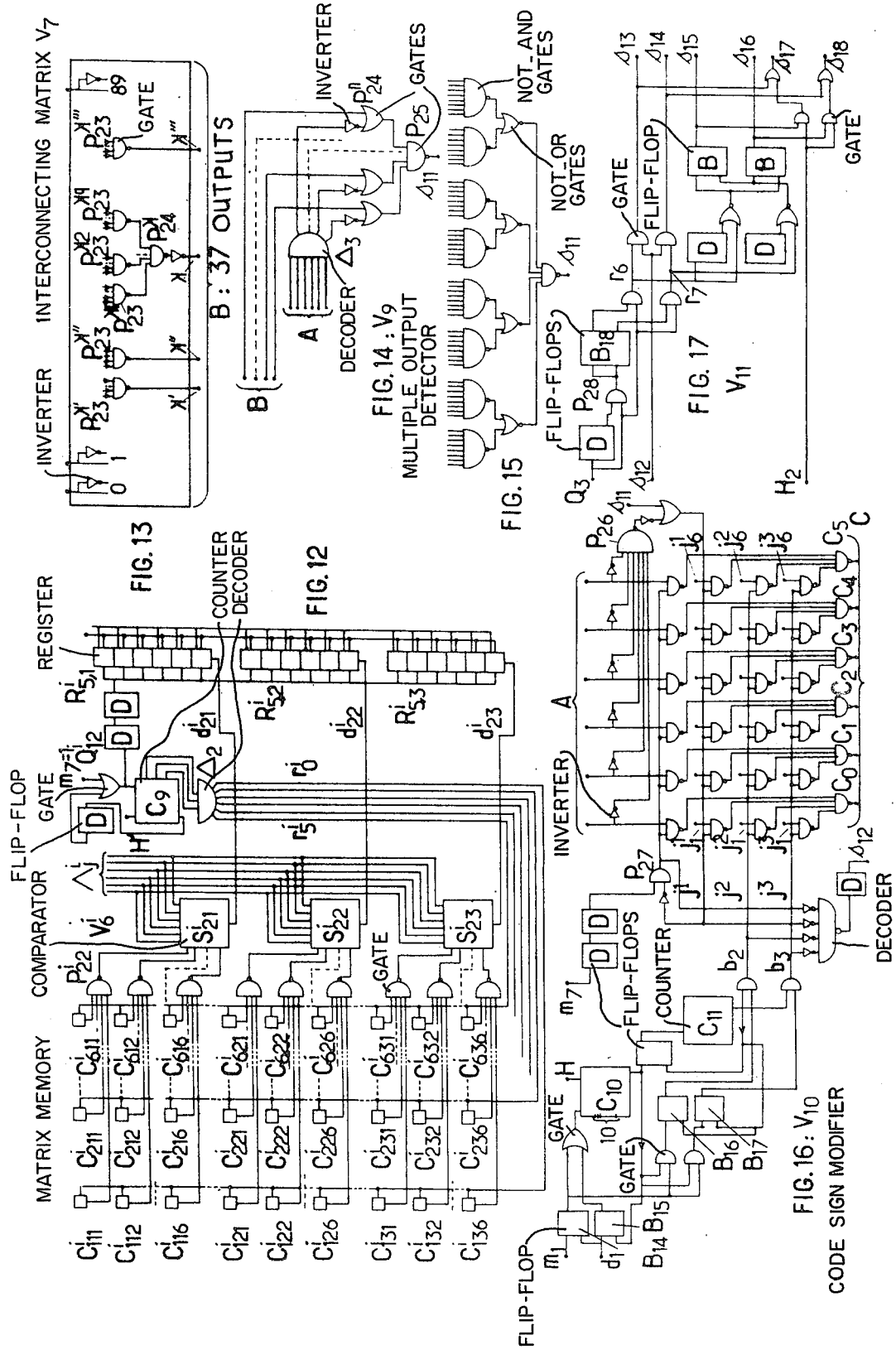

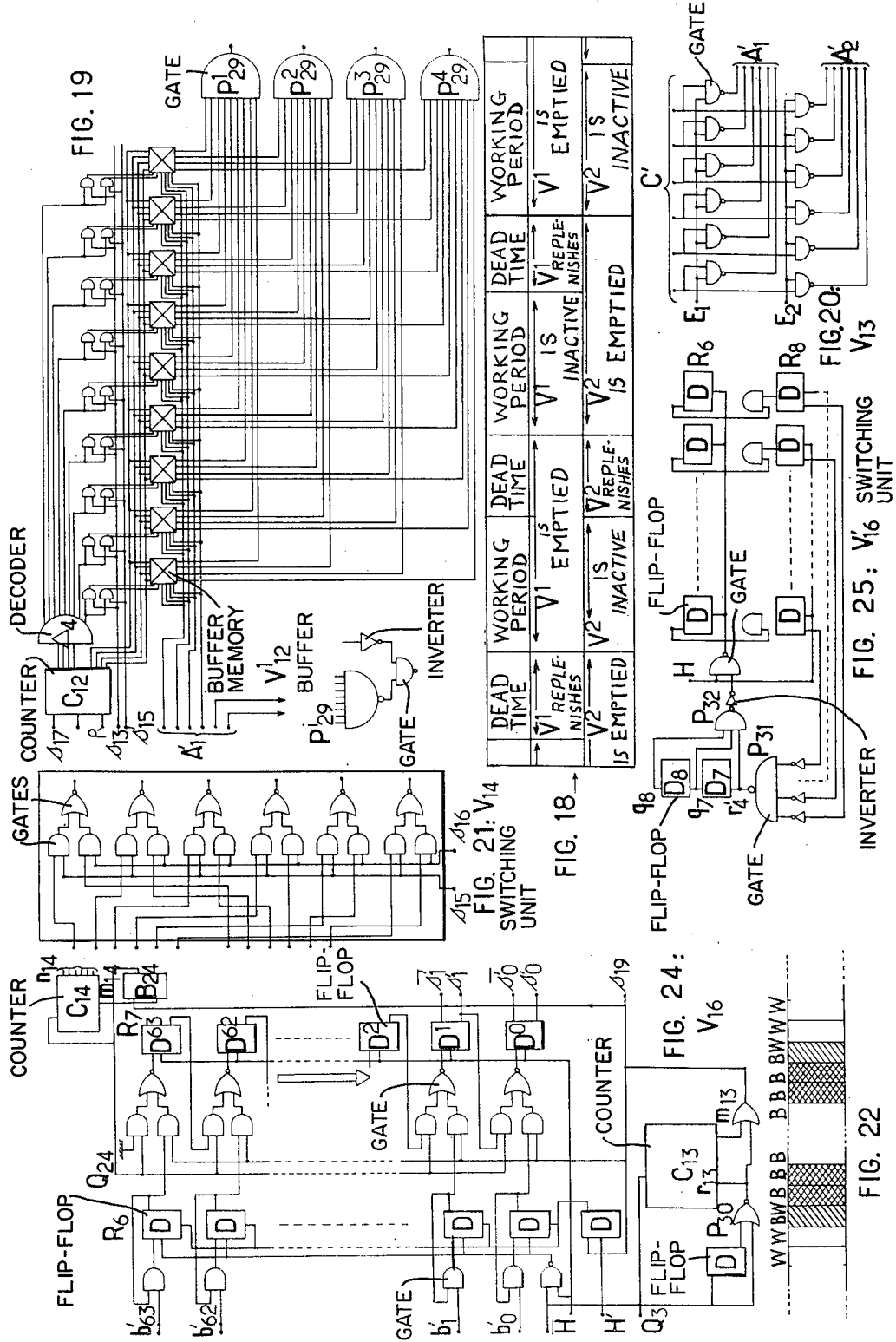

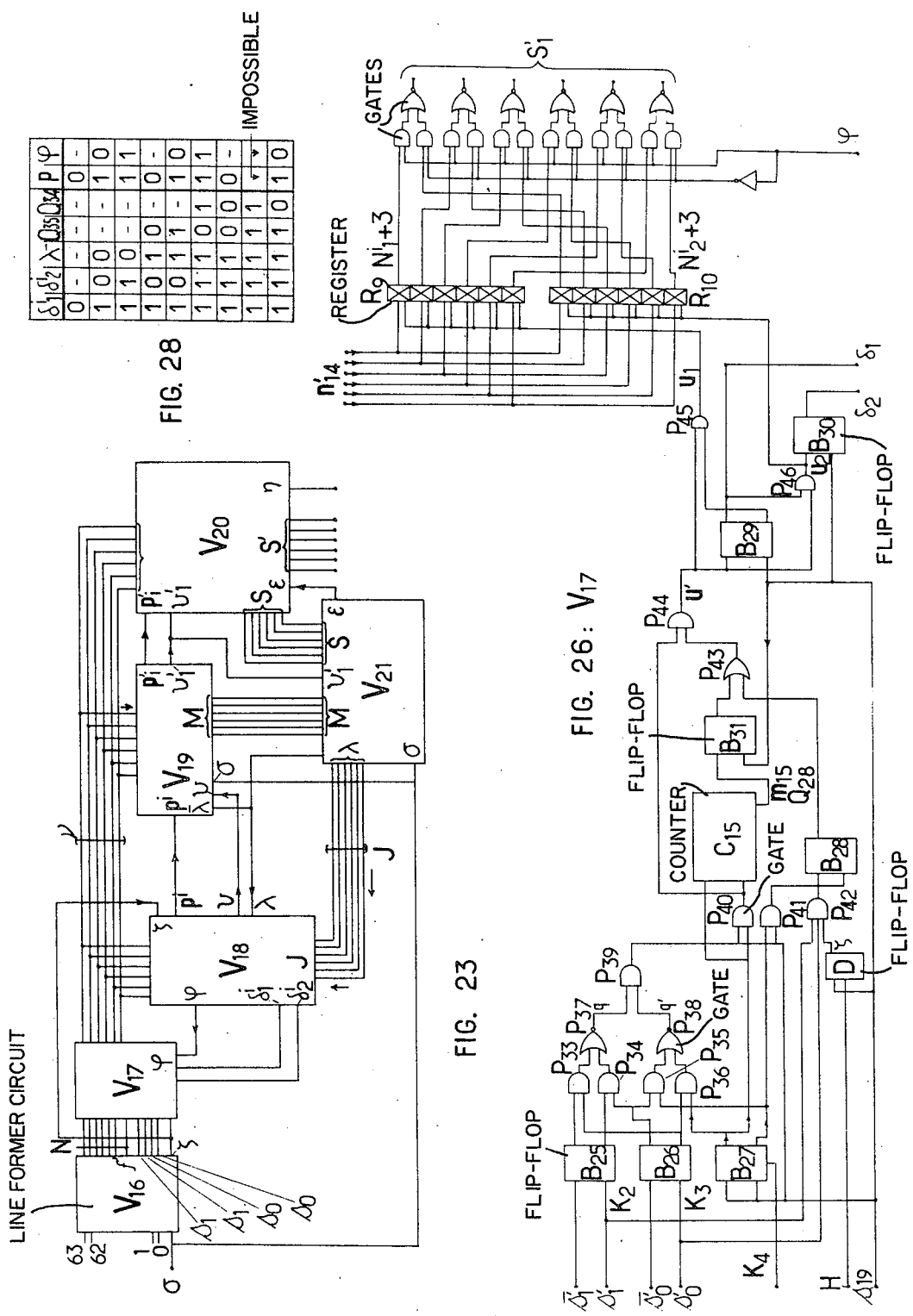

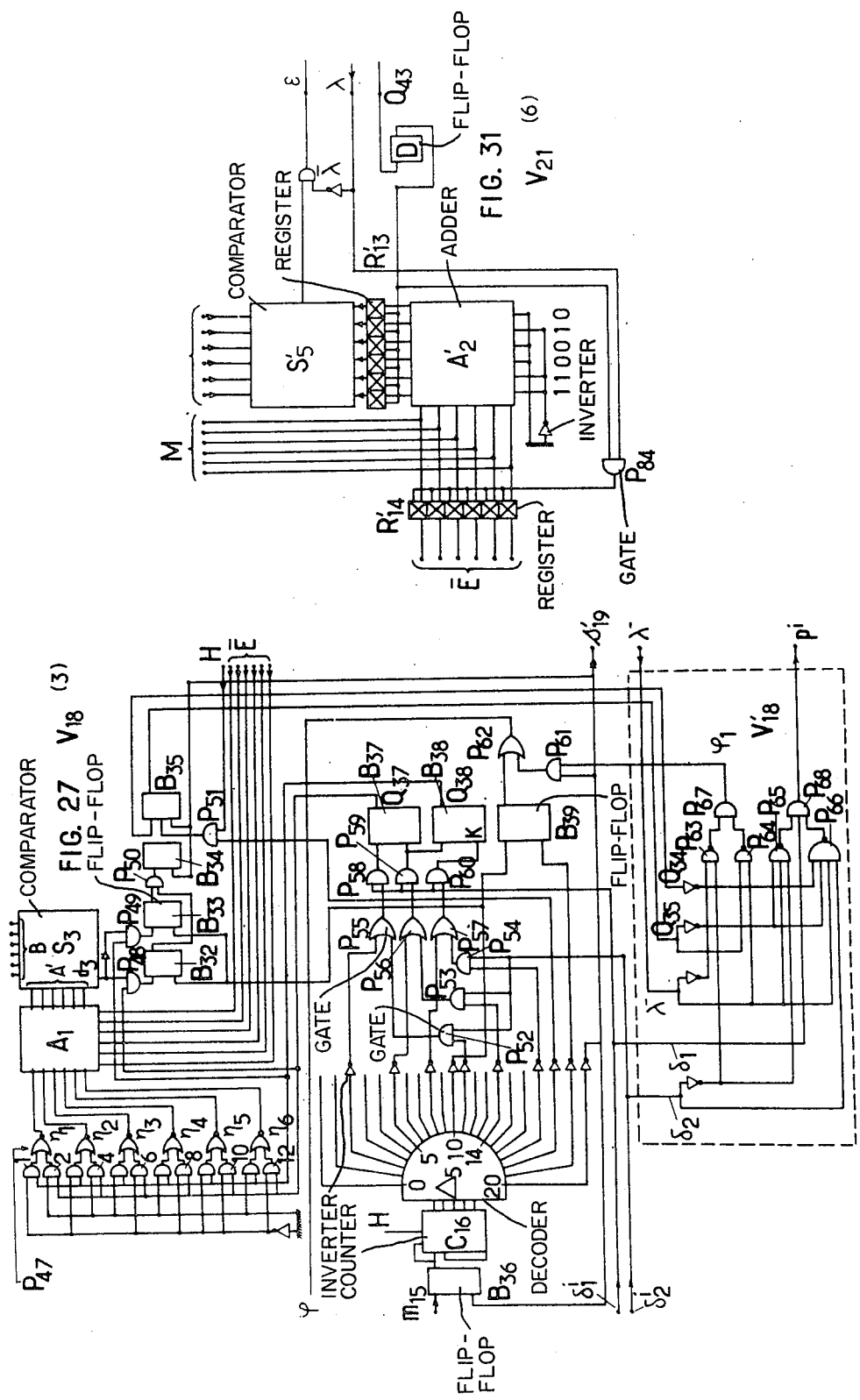

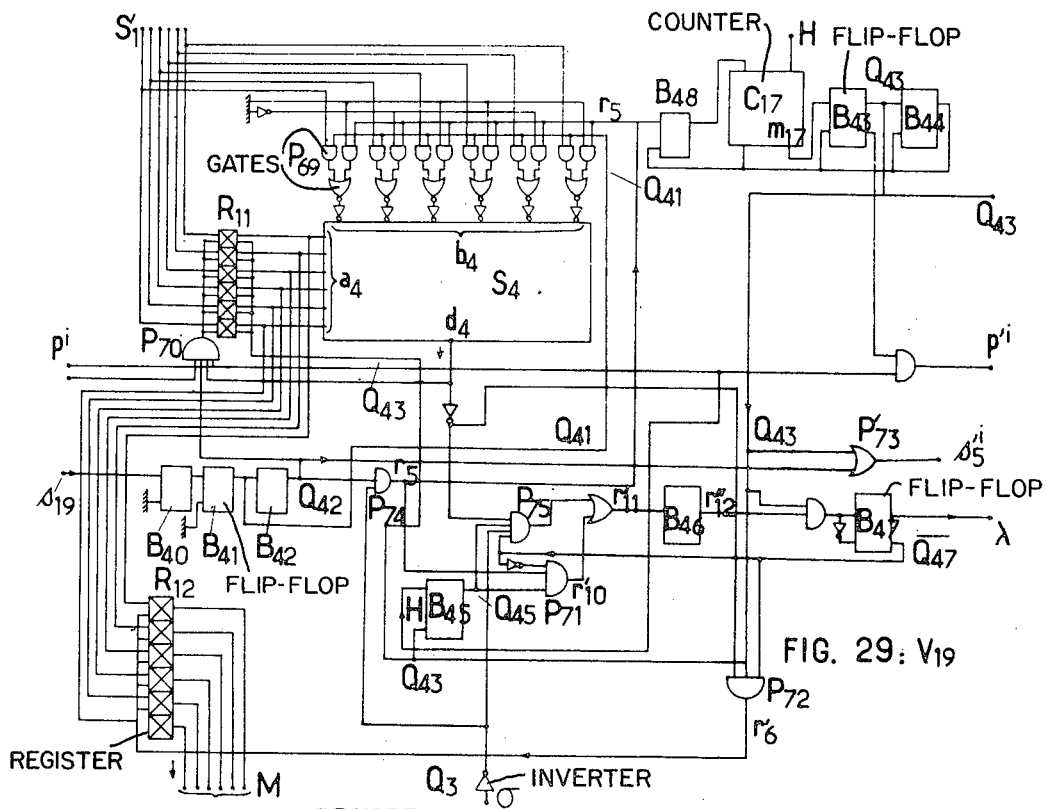
FIG. 29: $V_{19}$
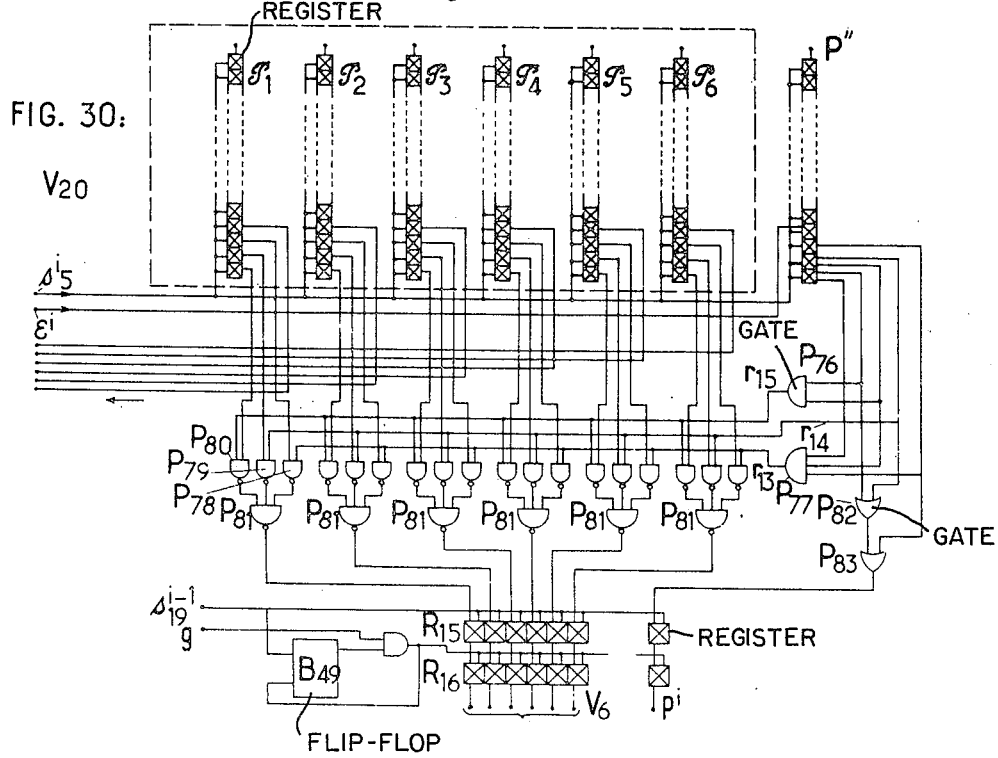
FIG. 30: $V_{20}$

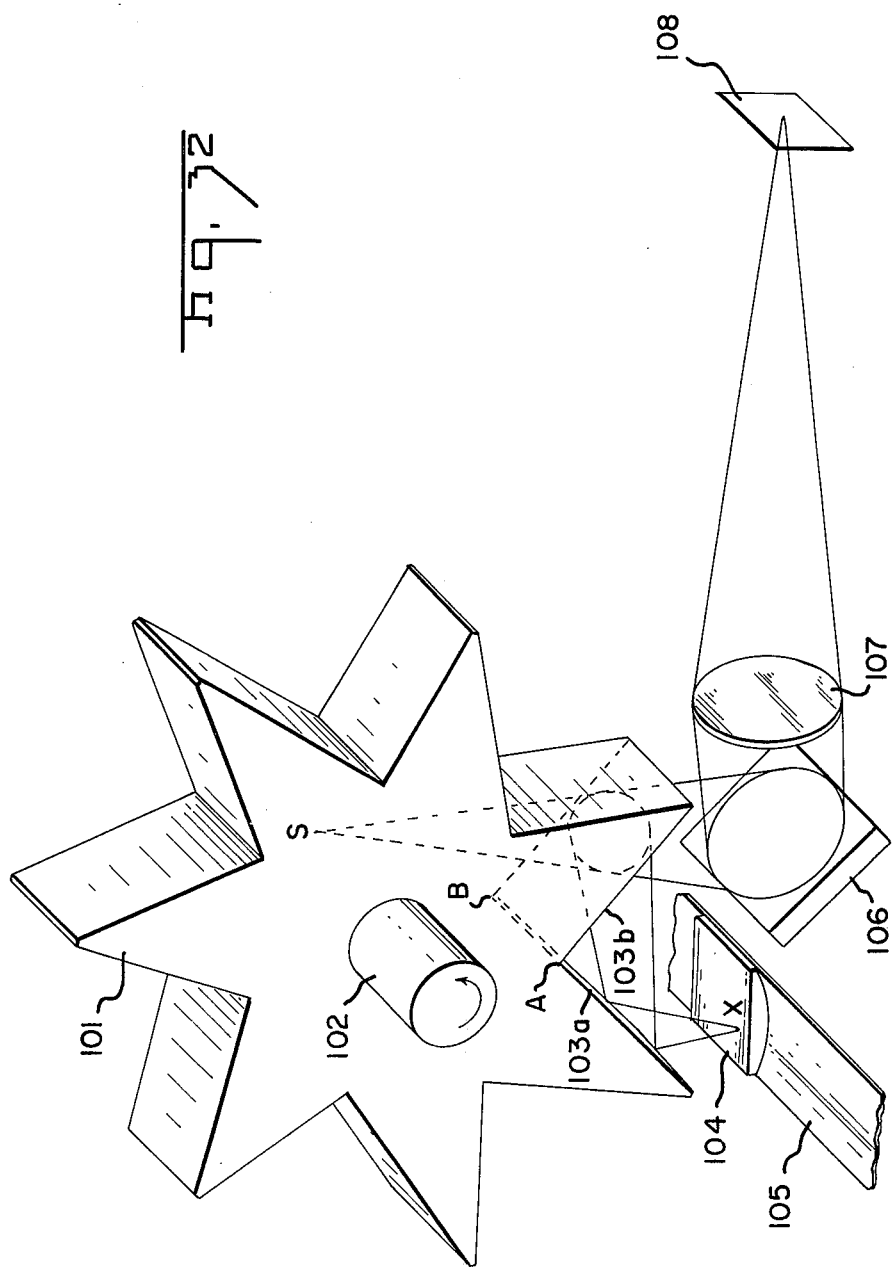

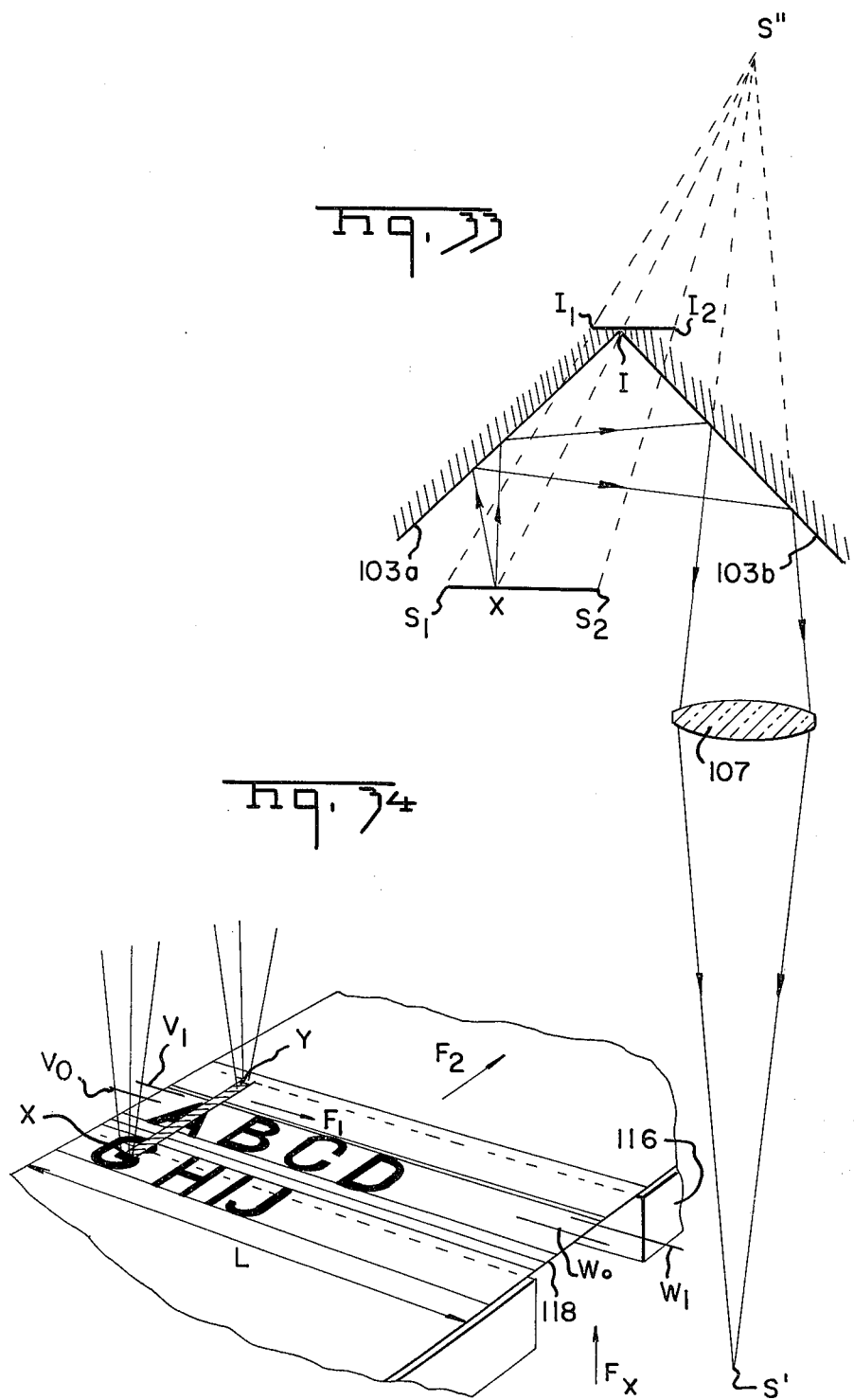

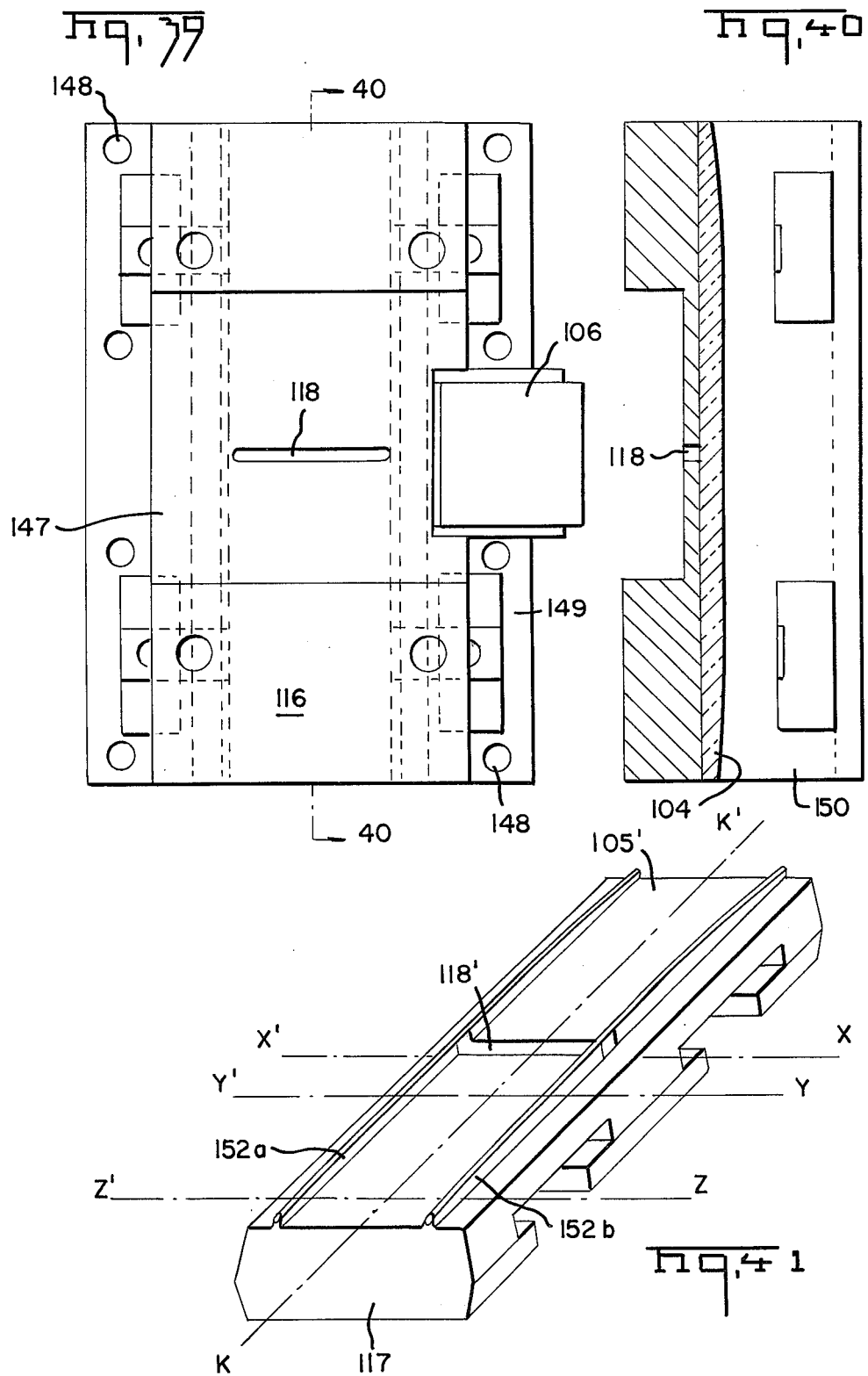

SYSTEM FOR SCANNING AND IDENTIFYING STANDARDISED CHARACTERS AT HIGH SPEED

The present invention relates to a system for scanning and identifying standardised characters.

The system comprises an apparatus for scanning the text, which supplies appropriate electrical signals, and an electronic apparatus for identifying the characters from such electrical signals.

The scanning apparatus is known per se and, when a micro-film is used, it is advantageously produced by employing the techniques described in French Pat. Application Nos: 71 08645 and 71 08646, which were filed in the name of Rene de Possel on Mar. 12, 1971, and respectively entitled "An electronic apparatus for analysing symbols on a micro-film" and "A precision guidance device for a micro-film".

A scanning apparatus of this type which will be described hereinbelow operates at high speed, which explains the usefulness of being able to identify the characters at high speed also.

The results of the identification process will be presented in, for example, binary-coded form and will be capable either of being fed directly to a computer or of being recorded on magnetic tape with a view to processing at a latter stage.

Present day types of apparatus which carry out identification of this sort employ various principles but cannot exceed a speed of a few thousands of characters per second, this applying in the most favourable cases when it is only figures or a small number of letters which are concerned.

It is an object of the present invention to produce an electronic device capable of identifying up to 300,000 characters per second when it is produced from high-speed TTL integrated circuits, and of operating more quickly if it is produced using ECL techniques. The only ultimate restriction on the effective speed of such an apparatus is therefore the speed at which signals are fed to it and the speed of the apparatus which uses or records the results which it supplies. The scanning device in the aforementioned Patent Applications admittedly allows one line of the text to be scanned at a speed of 300,000 characters per second where a 16 mm micro-film is being used but, since the time which elapses between the end of this scan and the time when the next line begins to be scanned is almost double the time taken to scan the line, the mean speed achieved is 100,000 characters per second.

It is a further object of the invention to produce an identifying apparatus of small bulk which is housed in a low cabinet on top of which may be mounted the scanning device and, possibly, the text transporter.

In the embodiment hereinafter to be described, the number of integrated circuit modules required is, in fact, less than 1,400. The device does not need to be specially air conditioned since its power consumption is less than 500 watts.

To achieve the above-mentioned and other objects, the invention consists in a system for scanning and identifying the characters in a document carrying a text made up of equidistant parallel lines of equal length positioned one bellow another, some lines possibly being blank, the said device including means for scanning the text in successive transverse sweeps during each of which a transverse band covering a small number of lines of writing is scanned, the document being movable relative to the fixed position of the band so that, between one transverse sweep and the next, each line of writing takes up substantially the same position as the line before, each band being itself scanned at a frequency T in J equidistant columns, each of said columns being divided into a number N of small areas which form a line, the said scanning means supplying N signals formed by a O or a I which correspond respectively to the whites and blacks or vice versa in the text, the system being characterised by the combination of means for extracting from each of the successive bands the signals corresponding to one line of writing in such a way that each line is extracted once and once only, means for extracting from each of the columns J in the band an interval comprising a fixed number N' of bits forming a part column G such that each column G extends over the whole height of the selected line of writing, it being possible for the position of the interval G in J to vary slightly throughout the transverse sweep, means for extracting a small number of columns from the columns G which cover each particular character in the selected line of writing, this number being determined as a function of their total, and means for determining, for each of the columns G selected, the lengths expressed as numbers of bits, of the intervals made up from consecutive whites and consecutive blacks respectively which form parts of G, means for comparing these lengths with fixed predetermined numbers, the said comparison means being so arranged that each of the characters in the alphabet employed has associated with it one or more inequality systems which compare certain of these lengths with fixed numbers, with the result that, if the inequality tests in one of these systems are satisfied, the character is identified, and means for feeding out the characters so identified in the form of coded signals.

In order that the invention may be more clearly understood reference will now be made to the accompanying drawings which show one embodiment of the system with its constituent parts, by way of example and in which:

FIGS. 1 and 2 illustrates the character identification principle on which the invention is based, FIG. 1 showing the zones for analysing a character and FIG. 2 being a table showing the inequality tests which enable characters which the system is suitable for processing in the embodiment described to be identified, FIG. 3 is an overall circuit diagram of the system, FIG. 4 is a diagram of a member termed a "shifter" which enables a column G to be extracted from column J.

FIGS. 5, 6 and 7 show members intended to detect almost blank columns (i.e. those containing no blacks or one black), FIG. 8 shows a member termed a "character framer,"

FIGS. 9 and 10, taken together show a member termed a "column selector,"

FIG. 11 shows a member termed an "interval separator,"

FIG. 12 shows a comparison member,

FIG. 13 shows an interconnection matrix which gives an identification result on the basis of the comparison results, FIG. 14 shows a multiple output detector of which, FIG. 15 shows a detail, FIG. 16 shows a member termed the "code-sign modifier,"

FIG. 17 shows a member for controlling the buffer stores,

FIG. 18 is a table showing how the buffer stores operate,

FIG. 19 shows half a buffer store,

FIGS. 20 and 21 show switching devices;

FIG. 22 shows the case where there are vertical black lines,

FIG. 23 is a general diagram of a member termed the "line former" the detailed description of which is illustrated by FIGS. 24 and 31.

FIG. 24 is a block diagram of an embodiment of sub-unit 16 of FIG. 23;

FIG. 25 shows a modification $V'_{16}$ of sub-unit $V_{16}$;

FIG. 26 is a block diagram of sub-unit $V_{17}$ in FIG. 23;

FIG. 27 is a block diagram of sub-unit $V_{18}$ in FIG. 23;

FIG. 28 is a truth table corresponding to sub-unit $V'_{18}$;

FIG. 29 is a block diagram of sub-unit $V_{19}$ in FIG. 23;

FIG. 30 is a block diagram of sub-unit $V_{20}$ in FIG. 23;

FIG. 31 is a block diagram of sub-unit $V_{21}$ in FIG. 23;

FIG. 32 is a view in perspective of the mirror wheel and of the parts of the luminous beams of a microfilm character reader;

FIG. 33 is a theoretical tracing of incident and reflected luminous rays in the device on FIG. 32;

FIG. 34 is a perspective view showing the scanning of a band of characters on film;

FIG. 35 is a longitudinal cross-section of the device on FIG. 32;

FIG. 37 is a cross-section of the wheel-housing according to V — V of FIG. 35;

FIG. 39 is a plane view of the film guidance unit;

FIG. 40 is a cross-section view VIII-VIII of FIG. 39;

FIG. 41 is a perspective view of the presser unit of the film; and

Figure 1:
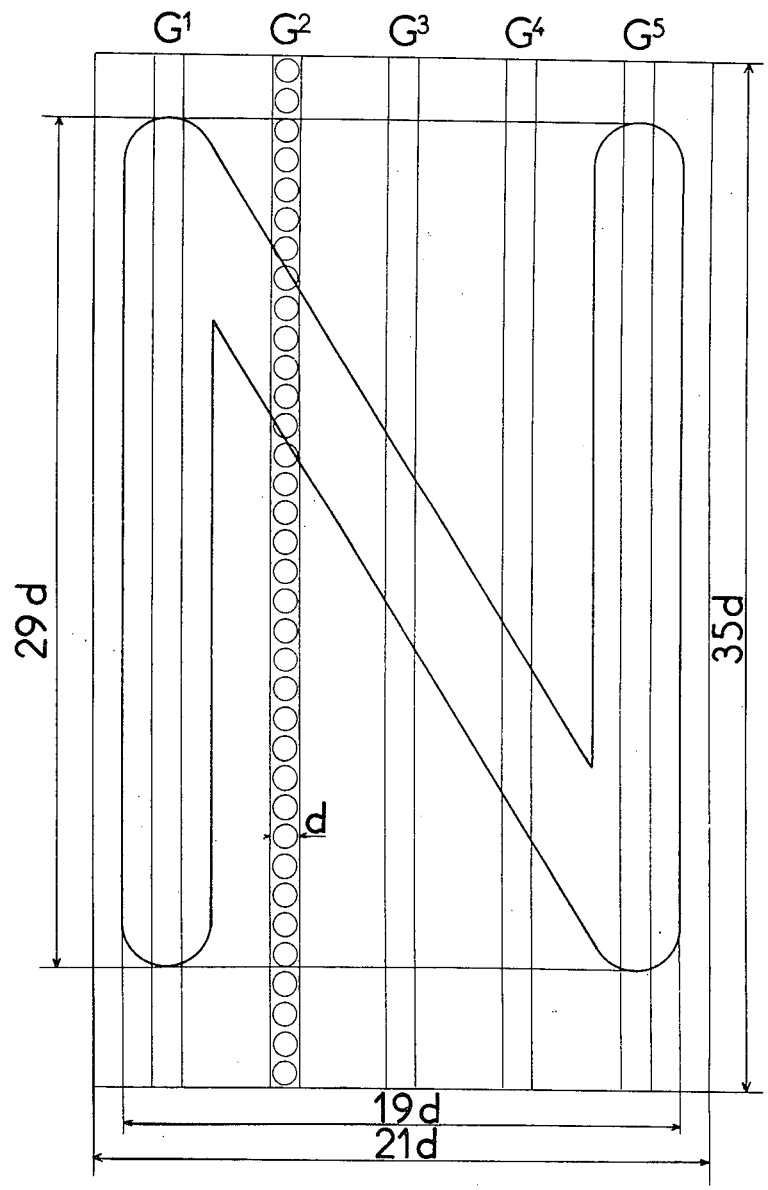

Referring now to the drawings, in the embodiment described, which is given as a non-limiting example, the number of different characters to be identified is 61, which embraces the capitals and certain signs, but, at the cost of very little extra apparatus, a slight modification enables 125 different characters to be identified, for example by adding the lower-case letters to the existing ones. To change from one type of alphabet to another, it is simply necessary in practice to change over a board containing less than 100 integrated circuit modules.

The principle on which this system operates will first be briefly explained in order to show how it is possible for the speed achieved to be of the order hereinbefore referred to. The first things to be mentioned will be certain conditions which have to be fulfilled if the system is to work. The text must be formed from parallel lines of equal length which are all orientated in the same direction (termed the "transverse" direction), which are situated one below another (remembering, the fact that it is possible for a line to contain an arbitrary length of "white"), and are equidistant, except where there is a blank line in which case, the depth of inter-line space down to the next line may be of any size whatever.

The scanning device must be such that scanning takes place in equal transverse bands F each of which covers two or three lines of text. Each time a band is scanned this will be referred to as a "transverse sweep" of the text and will be referred to by the letter U. Two successive bands overlap. When passing from one band F to the next band, which will be referred to as $F^+$, and when a line of text L occupies a certain position in F, the next line, which is referred to as $L^+$, occupies approximately the same position in $F^+$. The changeover from F to $F^+$ is thus equivalent to a translatory movement by a distance $p$ which will be referred to as the pitch of the text.

Each band is scanned in successive columns the direction of which, termed the longitudinal direction, is perpendicular to the transverse direction, the columns themselves being formed from a fixed numbe N of small and equal areas which form a straight line (FIG. 1) and the distance between whose centres is $d$ (N = 96 in the case of the embodiment described above). The small areas give rise to an equal number of binary signals which are 0 or 1, or 1 and 0 depending on whether the area is over a white or black in the text. The signals corresponding to a column thus form a binary "word" of N bits. The axes of two successive columns in the same band are spaced away from one another by a distance $d$. The columns are scanned at fixed intervals of time T (equal to 185 nano seconds in the example in question). T is the scanning frequency for the columns.

The device described in the French Patent Applications referred to above is suitable for carrying out a scan which meets the conditions which have just been laid down. In the system in the present invention, the scan will also have the following characteristics:

Let L be the line read in the course of the transverse sweep U. In the course of transverse sweep $U^+$, if the position of the next line $L^+$ is the result of a translatory movement by a distance fairly close to $p$ from the position of L, line $L^+$ will be read. If the translatory movement is too large or if no line $L_+$ appears, there is no read out.

From the N areas which form a column J the system selects beforehand a series of consecutive areas, the number of which, N', is always the same and is less than N, so that a line L is covered without including any black belonging to a neighbouring line. This series represents a "restricted column" G or a "framing interval". Numbering the bits in J from the bottom bit, which is numbered 0, the first bit in J which is in position F, is the "framing indicator". The latter may vary slightly in the course of the transverse sweep U, as well as from one transverse sweep to the next, as will be discussed below.

The original nature of the system described lies on the one hand in the introduction of this indicator and in the methods used to establish it and, on the other hand, in the means used to identify the characters, which processes and means will be described before a detailed description of circuits suitable for putting them into effect is undertaken.

From the word M of N bits which represents the black or white nature of the areas in column J is separated out, by means of indicator E, the word M' of N' bits which represents the nature of the areas in G.

The high speed of the device is a result of the following particular features of the aforementioned means. The words, each of which is formed by the N' bits in each of the part-columns G, are fed into a progressive store $V_2$ (FIG. 3), which is formed by $N'$ shift registers each of which moves up one position at each period T. For each of the characters successively encountered, means determine which is the first and which is the last of the columns G covering this character, which is carried out before the said column G is fed into the memory $V_2$. Means then indicate, as a function of the number of such columns which cover the character (i.e. as a function of the width, this width being capable of variation from one character to another) which are the columns which should be selected to identify the character.

Figure 3:
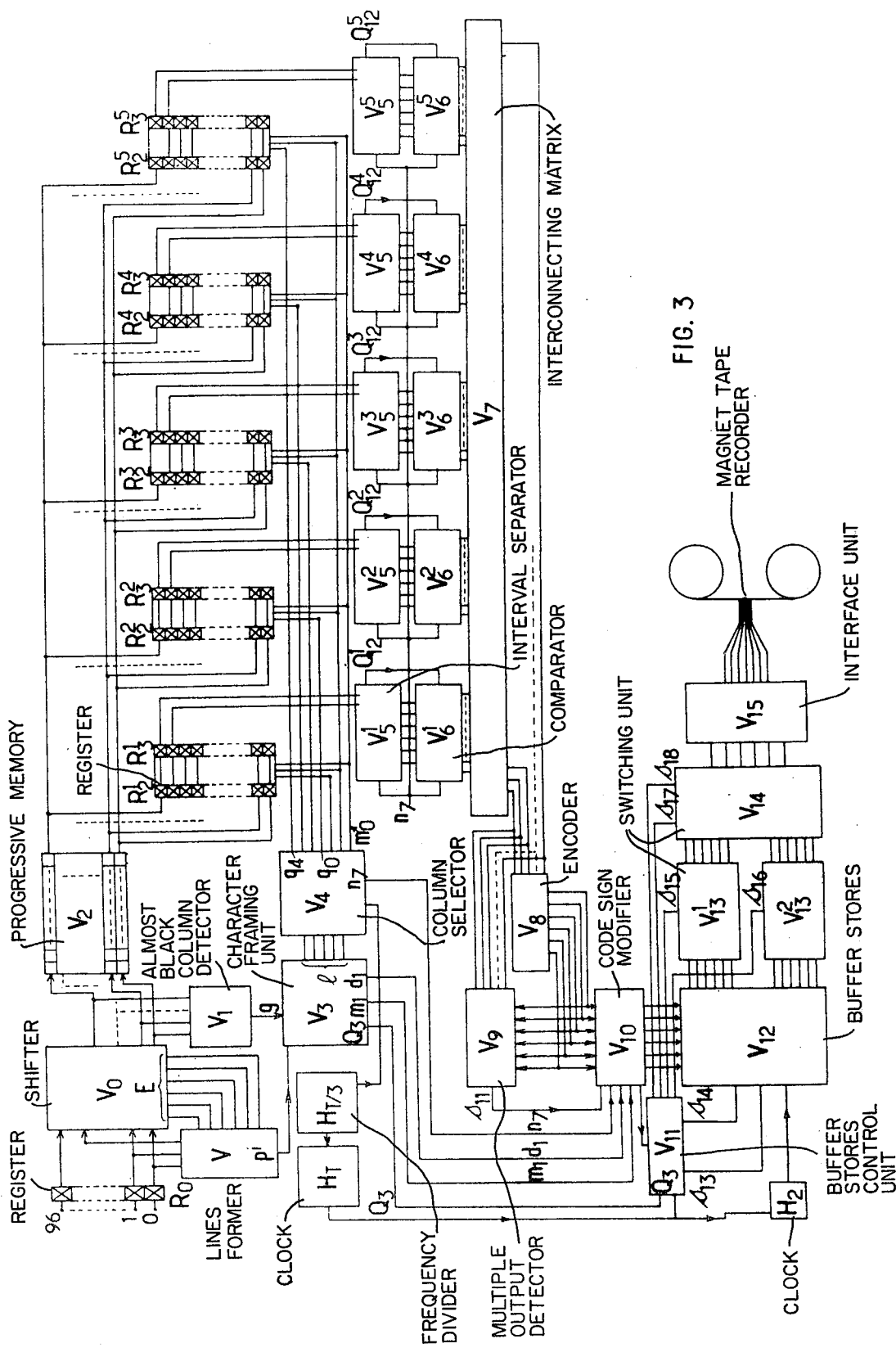
Figure 75:
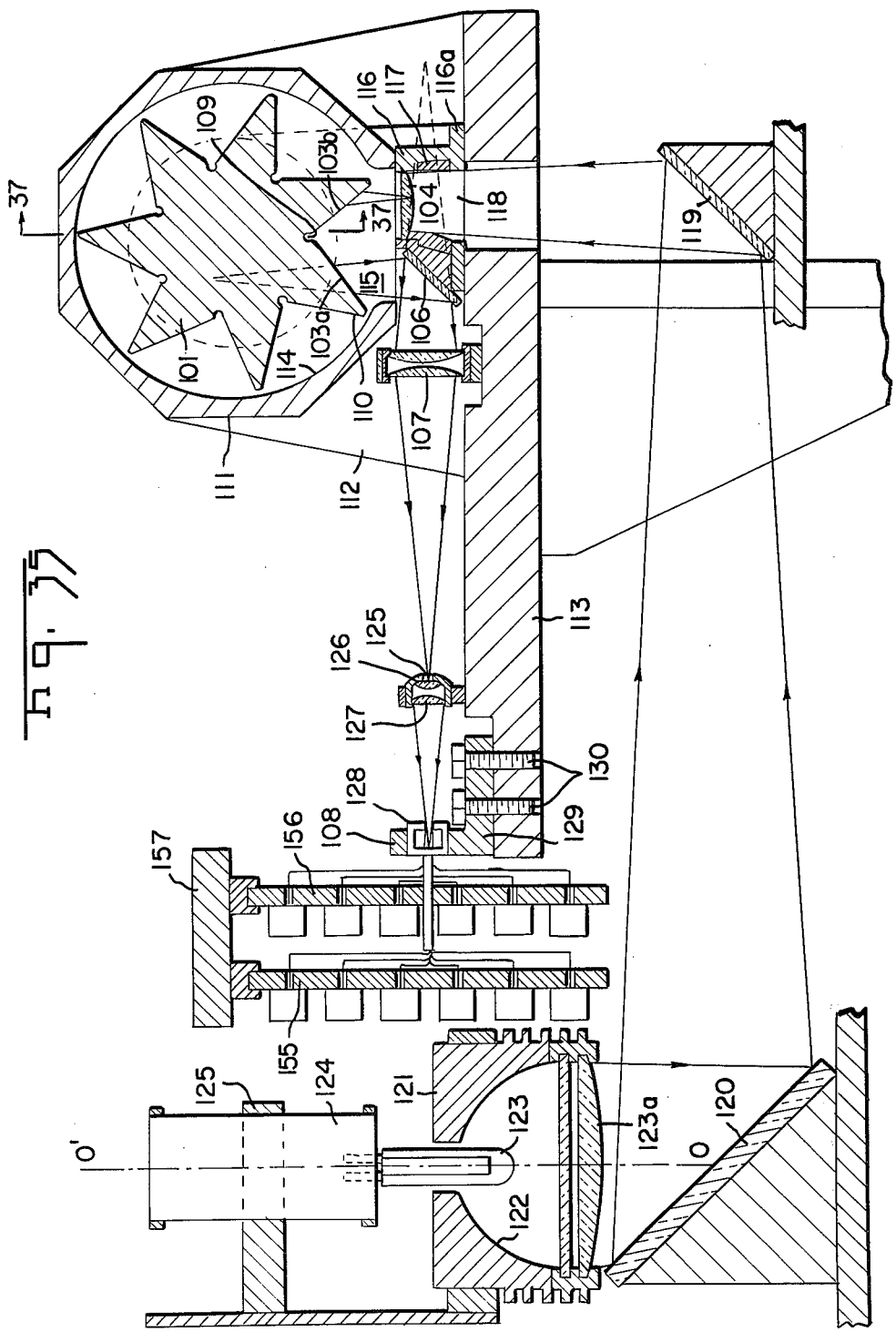

These columns $G^1$, $G^2$ ··· are then transferred to the registers $R^1_2$, $R^2_2$ ... (FIG. 3) from the store $V_2$. The registers forming $V_2$ must be of sufficient length to enable this transfer to take place in every instance. Once the transfer is completed, the columns $G^i$ are then transferred to registers $R^1_3$, $R^2_3$ ..., so as to free registers $R^i_2$ to receive the columns selected for the next character, which are extracted in their turn from $V_2$. Registers $R^i_3$ are such that means enable the lengths of the successive intervals in each of the columns $G^i$, which intervals are formed from consecutive whites and consecutive blacks respectively and are expressed as numbers of bits, to be extracted from the registers, the columns $G^i$ having possibly undergone certain corrections intended to eliminate the effects of spots or missing areas. Each time the length of one of these intervals has been established, it is compared to fixed predetermined numbers appropriate to the ordinal position $i$ of column $G^i$ and to the position of the interval in the column (first white interval, first black interval, second white interval, etc.). It is necessary for the means which enable the comparisons to be carried out to operate simultaneously for each of the fixed numbers in question so that they can again be used as soon as the length of a fresh interval in column $G^i$ has been determined, in order to compare this length to fresh fixed numbers. Such means must be provided for each of the columns $G^i$. The comparisons must be carried out in a time shorter than that required to establish the length of the shortest possible interval, i.e. 2 bits. The result of each comparison is given by a 0 or 1 bit which is fed into the input register of the interconnecting member $V_7$ (FIG. 3). This register is divided into sections corresponding to the various values of index $i$, each of which is itself divided into smaller sections corresponding to the successive intervals in the column $G^i$, each of the latter sections being formed by locations each intended to contain the bit resulting from each comparison.

The register is connected in the said interconnecting member by a network of gates to one or more output registers the bits of which correspond in each case to different characters in the envisaged alphabet. If identification takes place in the correct way, each of these output registers indicates a 0 (or 1) at the location which corresponds to the character identified and a 1 (or a 0) at all the other locations. Characters identified simultaneously by these output registers, if there are more than one should in principle be identical. The identification process needs to be fairly swift so as to free the register to receive the results of the comparison corresponding to the next character.

To sum up, the high speed of the identification system is attributable to the fact that a plurality of operations are carried out simultaneously on successive characters.

The various members and the particular ways in which they operate will now be described in greater detail.

A preliminary study of the alphabet to which the characters to be identified belong enables a choice to be made, as a function of the width $l$ of a character expressed as a number of bits, i.e. the number of columns G which cover it, of certain columns which suffice to identify the character. In the embodiment described in the example, these columns are the second and the one before last, plus, if the width of the character is greater than 16 columns, the columns whose positions are most nearly equivalent to a quarter, a half and three-quarters of the character. The system thus determines what positions the columns to be used occupy on the basis of the value of $l$. The columns will be referred to as $G^1$, $G^2$ etc. Counting the positions from 0, when $l = 19$ the columns used will be $G^1$ in position 1, $G^2$ in position 5, $G^3$ in position 9, $G^4$ in position 13 and $G^5$ in position 17.

These columns may be extracted in the store $R_2$ or at its output. For each value of $i$, column $G^i$ is subjected to an analysis which determines the successive intervals made up of series of whites and series of black from which it is formed. These intervals will be referred to as $I^i_1$, $I^i_2$ etc. Their lengths $\wedge\, ^i_1$, $\wedge\, ^i_2$, expressed as numbers of bits, are established by the system. The preliminary study of the alphabet mentioned above enables the characters to be identified by comparing the numbers $\wedge\, ^i_j$ with certain constants. To be more exact, the study enables certain of the pairs of integers (i,j) to be co-related with a small number of constants $C^i_{j\,1}$ $C^i_{j\,2}$..., and also enables one or more inequality tests $S_{\varkappa\,,1}$, $S_{\varkappa\,,2}$ of the form $\wedge\, ^i_j < C^i_j$ or $\wedge\, ^i_j > C^i_j$, to be co-related with each of the characters $\varkappa$ making up the alphabet so that, if one of these tests is satisfied by the lengths $\wedge\, ^i_j$ established for a scanned character, the character in question is the same as $\varkappa$.

FIG. 2 groups together the various comparisons which enable characters to be identified by means of successive measurements involving columns $G^3$, $G^1$, $G^5$, $G^4$, $G^2$.

As regards framing in the course of a transverse sweep U, the system generally carries out two separate operations. Firstly, as just explained, it identifies the characters in a line of writing L and then the signals coming from the next line $L^+$ if it is wholly or partly contained in the band B being scanned. At the same time the device establishes the framing indicator E which will be used in the following transverse sweep $U^+$, at which time this line $L^+$ will have assumed the same position in the next band $F^+$ as that occupied by L in band F, this position being an approximate one since, if it were occupied with absolute consistency, the framing indicator would always be the same for any column J occupying a specific position from the beginning of the line.

The indicator E used in the course of $U^+$ is established a number of times in the course of U due to the possible slope of the line of writing in relation to the transverse direction of the band. For this reason the bands are split up into equal zones $Z^1$, $Z^2$, with the possible exception of the last band. A framing indicator $E^q$ is possibly established for each zone $Z^q$.

Slight corrections are then made to the translatory movement $p$ so that, each time a transverse sweep takes place, a line of writing which follows the line which has just been read with normal interline spacing, is situated completely within the scanned band.

Besides identifying characters, the system also provides certain other information. A special symbol idicates a space. It is repeated a number of times equivalent to the number of normal spaces separating two "words" which the space in question contains. When a character in the text gives rise to lengths $\Lambda_j{}^i$ which satisfy two tests S corresponding to different characters in the alphabet, a signal indicating "character not recognised" is emitted and the same signal is also emitted when no character in the alphabet corresponds to the values of $\Lambda_j{}^i$ obtained.

Furthermore, if, as a result of a spot for example, successive small columns G are encountered during a transverse sweep which contain a number of blacks which is too large to form a character, a second special signal is emitted as many times as this number contains the average number of columns in a character.

Finally, if the identification signals are issued at too rapid a rate to be recorded directly on a magnetic tape, buffer stores may be used and advantage may be taken of the fact that the time taken for the "line return" is distinctly greater than that taken to scan and identify a line.

Procedures described below are used to reduce the number of errors or of characters not recognised. When establishing which of the columns G cover a character, it is possible to ignore those which contain only a single black. In a similar way, when examining for the black and white intervals in a column G, it is possible to ignore an isolated black or an isolated white. In this case, beginning with the first bit in G, the first interval is always assumed to be white. Its length is zero if G begins with two blacks. The first black interval then begins with two blacks and continues until two consecutive whites occur. The second white interval starts at this point and the process continues accordingly. The same may apply when establishing the framing indicator E. To establish it, it is necessary, as will be seen, to divide a word into intervals formed by consecutive whites or consecutive blacks.

In order to reduce the number of wrong or unrecognised characters, a character may be identified a number of times using different inequality systems S. If, for example, each character is examined twice, the "not recognised" signal is emitted when the two results are different. If three different identification operations are carried out, which is possible with the alphabet envisaged, it may be conceded that if the same character is identified two times out of three it should be admitted. Finally, it is also possible, as mentioned in the detailed description below, to provide means to prevent the identification operation from being disturbed by the presence of vertical black lines formed by borders around part of the text.

The conditions which the text to be identified and the way in which it is scanned must satisfy will now be specified. Mis-alignment between characters along a line of writing should not exceed 0.5 $d$ (where $d$ is the distance defined above). The inter-line space or the maximum height of the blank strip which may appear between two lines must be accurate to within $d$, unless it is noticeably greater than the pitch $p$. The slope of the mean direction of a line to the transverse direction should not exceed $\alpha$ radians (in the example described $\alpha$ is taken to be equal to (1/1000). The outlines of the characters should not differ from their theoretical configuration by more than the length $d$, which length be a little greater than a third of the thickness of the finest line forming part of the characters.

The resultant limiting factors on the scan and the electrical signals are as follows:

1. The slope of the scanning strip relative to the line of writing should not be greater than $\beta$ radians (in the example described $\beta = 4/1000$). The latter limitation gives a maximum variation for $E^q$ in the various zones $Z^q$ in the same transverse sweep. If L is the length of a line of writing, this variation is $\mu = (L\beta/d)$ ($\mu = 12$).

2. When a scanning area is situated partly over the white and partly over the black, the signal obtained should be 0 or 1 depending on whether the white area is larger or smaller than the black area. The signal obtained in fact becomes random when the difference between two areas is less than a certain value $\delta$, which should be fairly small, for example a third of the total area. This number $\delta$ is the smaller the more nearly identical is the sensitivity of the photo-receiver device or devices contained in the system for the different areas in a column.

In addition, with the embodiment described, the 0 or 1 signals originating from the same column are obtained simultaneously. They must be TTL compatible. To this end, the photo-receivers from which they originate, which are N in number, are connected to differential voltage comparators (FIGS. 8, 12, 29 and 31) which apply signals of the required nature at their outputs. It is necessary that the combined response times of the photo-receivers and the comparators be less than T/2, failing which the signals from one column will be interfered with by those from the preceding column.

The numerical values adopted in the embodiment described are as follows: the text is printed from a magnetic tape onto 16 mm micro-film using one of the pieces of commercially available equipment which allow this to be done. The lines run transversely and are 14 mm in length with a density of 64 lines per cm. The pitch $p$ is therefore 156.25 microns. Since the thickness $e$ of the lines from which the characters are formed is from 12 to 14 microns, N' is made equal to 35 which makes $d = (P/N) = 4.46$ microns. This value does not substantially exceed $e/3$, which is a condition which must be satisfied if the characters are to be identified correctly. Since the framing process used requires a scanning band covering approximately 2¾ lines, N is set at 96 since 2.75 N' + 96.25. The distance between the centers of two consecutive characters is then 21$d$. The alphabet for the texts to be identified comprises the 26 letters and the figures from 1 to 9 plus the full stop and comma, with the letter O and the numeral 0 forming only one character. All the characters are of equal height and width except the capital "I", the numeral 1, and the comma. The nominal width of a standard character is $l + 19$ but it is also possible for $l$ to be equal to 18 or to 20 and, in exceptional cases, to 17 or 21. As already stated, the number of columns used, or the value assumed by the index $i$, is five for normal characters and two for thin characters. The number of intervals $I_j{}^i$ for a given column (a specific value of $i$ ) may be 6 ($j = 0,1,2,3,4,5$). The number of inequality tests $S_{>|m}$ for the same character $v$ is usually 1. It may be as many as five in the example described.

FIG. 2 shows how successive comparisons between the numbers $\Lambda_j{}^i$ and suitably selected constants $c_{jm}{}^i$ enable the complete set of characters of normal width to be divided up into smaller and smaller sections until each section contains only one character. This division is performed by considering first of all the column $G^3$ closest to the centre of the character, the length of the successive intervals in which, beginning from the top of the character, are $bm1$ (the first white inteval of the centre portion) $nm1$ (the first black interval in the same portion), $bm2$ (the second white interval) $nm2$, $bm3$, $nm3$. The numbers of intervals may be zero beginning from any one among them, and the first number also may be zero. The characters T,Y,V, and 7 plus six groups of character are thus differentiated by means of the centre column.

The second character column selected ($G^1$) gives interval lengths $bg1$ (the first white interval at the left-hand edge), $ng1,bg2,ng2$ . . ., which, when compared with constants, enable certain of the aforementioned group to be divided up. This gives the characters J,W,X,K,4,D,A,S,5. Nine groups of characters remain (the A may be obtained by using two different inequality tests).

The column before last ($G^5$) supplies further intervals $bd1,nd1,bd2,nd2$, which, when compared with constants, divide out the characters L,U,Q,C,9,F,S,P,R,-B,E,Z,8,2,3. Four groups remain. The S may be obtained by using three different inequality tests. The column most closely equivalent to three quarters of the width of the character supplies useful intervals $b¾_{,1}$ $b¾_{,2}$ $n¾_{,3}$, which, when compared with constants, enable characters M,N,H,O,Q,S,G to be divided out. Finally, the quarter column enables the 6 and the 9 to be divided out from the remaining items. It can be seen that the number of comparisons made for the same black or white interval does not exceed three.

Scanning speed is of the order of 300,000 characters per second for one line of text. Since the dead time between the end of one line-scan and the beginning of the text is almost double the time taken to scan a line, the mean speed is 100,000 characters per second. Now that the principle on which the system operates has been explained, a detailed description of an electronic circuits enables the principle to be put into effect will now be given as an example.

The circuits are made up of gates, which are represented by the conventional symbols, inverters, and other more complex components which will be referred to as follows:

The $k$th flip-flop of type D is marked $D_k$ and is shown by a rectangle (FIGS. 8,10,11,16,17,24,25,26 and 31). Its input is marked $d_k$ and its outputs $q_k, \bar{q}_k$.

The $k$th flip-flop of type JK is marked $B_k$ and is represented by a rectangle (FIGS. 8,10,11,16,17,24,26,27,29). Its inputs are marked $J_k$, $K_k$ and its outputs $Q_k$ and $\bar{Q}_k$.

The $k$th counter $C_k$ is shown by a square, at the left of which appear lines which supply an initial setting value $P_k$ to it in binary form, while at the right appears the value $n_k$ indicated by the counter. At the top is activating line $a_k$ and at the bottom the zero reset line $r_k$ and the output line $m_k$ which gives a 1 signal when the output is entirely made up by 1. (FIGS. 8,10,11,16,19,24,26,27 and 29).

The $k$th comparator $S_k$ has the numbers to be compared ($a$ and $b$) fed into it at the top and on the left, and at the right it emits a signal $d_k$ the value of which is 1 if $a_k \leqslant b_k$ and 0 in the reverse case (FIGS. 8,12,29 and 31).

The 96 bits of the column being scanned (which come from a scanning device as described hereinunder appear at the output of register $R_o$ (FIG. 3) when the clock H (FIG. 4) is high, a few nano seconds after time 0 which, by definition, is the rise time of the preceding signal H. In this 96 bit word M a 0 represents a black and a 1 represents a white. The word must be shifted downwards so that the bit in position E (the framing indicator) comes into the 0 position and the shift must be one of E positions, the 35 lower bits alone having to be retained after the shift. This number E, which is between 0 and 62, is produced in binary form in register $R_E$ (i.e. one of the registers $R_2^1$ $R_3^1$ etc, in FIG. 3) in the form:

$$E = 2^5e_0 + 2^4e_i, + 2^3e_2, + 2^2e_3 + 2e_4 + e_5$$

The procedure employed consists in making successive shifts by a number of positions equivalent to the successive terms in this expression. The operation is carried out by a special member, the shifter $V_0$ (FIGS. 3 and 4). To make the first shift by $2^8 = 32$ positions or 0 position, depending upon whether $e_o$ is 1 or 0, the lines emerging from the 96 flip flops in $R_o$ connect up with the 64 gates $P_0$ to $P_{63}$, gate $P_0$ receiving the line $F_r$ in position $r$ and lead $F_r+32$ in position $r + 32$. The gates are AND —NOT — OR gates and they have a typical switching time of 6 nanoseconds. The gates P $^r_0$ are controlled by the $f_0$ and $\bar{f}_0$ the respective states of which are $e_0$. If $e_0 = 0$, there is obtained at the output of gate P $^r_0$ information complementary to that supplied by F $_r$. If $e_0 = 1$, information is obtained which is complementary to that provided by $F_r + 32$. It is as well to obtain items of information complementary to one another in lines 64 and 65. For this purpose, inverters are positioned along these leads, as shown in FIG. 4.

The second shift is one of 0 or 16 positions depending on whether $e_1$ is 0 or 1. If $e_1 = 1$, the shift is conveyed by the lines in positions 16 to 65. It is carried out by means of 50 gates P$^r_1$ of the same type as the gates P$^r_0$.

The third shift is one of 0 or 8 positions, depending on the value of $e_2$. If $e_2 = 1$, it is conveyed by the lines in positions 8 to 49 and is carried out by means of 42 gates P$^r_2$.

The fourth shift is one of 0 or 4 positions, depending on the value of $e_3$. If $e_3 = 1$, the shift is conveyed by the lines in positions 4 to 41 and is carried out by means of 38 gates P$^r_3$.

The fifth shift is one of 0 or 2 positions, depending on the value of $e_4$. If $e_4 = 1$, the shift is conveyed by the lines in positions 2 to 37 and is carried out by means of 36 gates P$^r_4$.

Finally, the sixth shift is one of 0 or 1 positions, depending on the value of $e_5$. It is conveyed by the lines 1 to 35 and is carried out by 35 gates. P$r_5$. At each passage through a gate the complement of the information is formed.

The 35 bit word appears at the output of register $R_1$, (FIG. 4). As in $R_o$, the whites are shown by 1. So as to have slightly more time for the gates to change over, the register $R_1$, may, as a modification, be formed by flip-flops JK which will accept changes of input during the whole of the clock cycle.

It is as well to detect those of the column G which contain no blacks or one black and which will be termed "almost black columns" at the output of $R_1$. The member $V_1$ (FIG. 3) which performs this detection receives the 35 bit word M' emitted from $R_1$ $g$ intervals T. It supplies at $g$ a 0 bit if M' contains no more than one 0 bit and a 1 bit if M' contains more than one 0 bit. It operates as follows:

Each of the logic circuits $V_1{}^i$ (FIG. 5) of which it is composed ($i = 1.2.3.4.5.6$), receives the bits 6i-6 to 6i-1 of the word M' (except for line number 35 which does not exist). If at least two of the first three lines, or at least two of the last three lines are at 0, then one of the outputs of gates $P^1_6$ or one of the outputs of gates $P^2_6$ is at 0. If one of the first three lines is at 0, and one of the last three is also, gates $P^1_7$ and $P^2_7$ give 1 at their outputs and $P^3_7$ gives a 0 at its output. One of the inputs of $P_9$ is therefore at 0; consequently $g_i$ is at 0. If on the other hand, there is zero or a 0 bit on one of the six input lines, the outputs of gates $P^1_6$ and $P^2_6$ are at 1. The output of one at least of gates $P^1_7$ and $P^2_7$ is at 0.

The output of $P^3_7$ is therefore 1. All the inputs of $P_9$ are at 1 and $g_i = 1$. If the six input lines are at 1, the outputs of $P^1_7$ and $P^2_7$ are at 0 and $k_i = 1$. On the other hand, if at least one of the six input lines is at 0, $k_i = 0$.

The device $V_1$ (FIG. 3) further incorporates a circuit $V^0_1$ (FIG. 6) which has connected to it six lines $k_i$ and operates in the same way as each of the circuits $V^i_1$ except that there is no $P_8$. The output $g_o$ of this circuit is 0 when two of the $k_i$'s are at 0 and $g_o = 1$ if none or one of the $k_i$ is at 0. Finally, device $V_1$ incorporates a gate $P_{10}$ (FIG. 7) which to which are connected lines $g_o$ and $g_i$ and which provides an output signal $g$ which is equal to 0 or 1 depending on whether the seven input lines are all at 1 or not.

The member $V_1$ which has just been described is produced from TTL components whose typical change-over time is 6 to 9 nanoseconds which gives this member an operating time of 46 nano-seconds which is very much less than T.

Let us return to the word M' at the output of $R_1$. The "shifter — up" $V_2$ (FIG. 3), which is formed from 35 shift registers, receives the word M' at its first location, while the words preceding M' are each moved up by one position. The length of the registers must be such that they contain all the G columns making up a character when the columns which are to be selected to identify the character have been established on the basis of the width $l$ of the character by members which follow. The number $l$ may be as great as 21, though its typical value is 19 for a character of normal width. A time of T must be allowed for $V_1$ to operate and a time of 2T for the two succeeding members to operate, these two members being the character framing device $\lambda V_3$ and the column selector $V_4$ which are about to be described. The length of the registers in $V_2$ must be at least 24 bits. They may be produced from twin shift-registers modules of 8 bits each, which gives 53 modules.

The "character framing device" $V_3$ (FIGS. 3 and 8) fulfils a number of functions. If a series of more than 20 "almost blank" columns occurs, the device produces a "spare" signal $m_1 = 1$ at the 21st column. The signal may possibly be renewed after each series of 21 almost blank columns (21 columns represent the distance between the axes of two consecutive characters). If a column containing at least two blacks occurs and if the number $l$ of such successive columns is a maximum of 21, this must represent a character. If the number exceeds 21 this may represent a number of characters which have been accidentally linked together or ones underlined with a continuous stroke.

Following the last character in the line, it will be appreciated that the first columns encountered will be almost blank, and that then black columns will be encountered during the whole of the dead time until the next line begins. The latter starts with several almost black columns until the first character begins.

Where $l$ is greater than 21, if the line is uncompleted, a special signal is produced by the counter $C_2$ and the comparator $S_1$ contained in $V_3$ (FIG. 8).

The framing device $V_3$ supplies a signal $Q_3 = 1$ which is emitted by a flip-flop $B_3$ which remains at 0 during the dead time, changes to 1 when the first almost blank column occurs in the line, and returns to 0 when the column in position $\nu$ is reached, the number $\nu$ being selected so that this column must necessarily fall after the last character in the line.

In the example envisaged, since the line contains 132 characters of 21 columns each (typical value) $\nu$ has been taken as 2,800 but this value might have to be altered to suit the characteristics of the text. Line $Q_3$ remains at 0 until the beginning of the next transverse sweep.

The operation of the framing device $V_3$ will now be explained. During the dead time, i.e. between the end of one line-scan and the beginning of the next line-scan, the 12-bit counter $C_3$, remains at 0. In flip-flop $B_3$, inputs $J_3$ and $K_3$ are at 0, and output $Q_3$ remains unaltered and thus equal to 0 since signal $M_3=1$. At the beginning of the line $g$ reverts to the value 0, and $Q_3$ consequently changes to 1 until $C_3$ emits a signal $m_3 = 1$. When this signal is given, $Q_3$ changes to 0 no matter what the value of $g$, i.e. no matter whether it is still the working period or whether the dead time has already been reached. To ensure that operation takes place in this way, it is merely necessary to set $C_3$ to an initial value of $2^{12} - \nu = 1296$. This being so, $C_3$ emits signal $m_3 = 1$ when the number $C_3$ indicates is formed solely of 1's. It can be seen that $Q_3$ remains at 0 during the dead time.

To give an example, with the embodiment described hereinunder which is the object of French Patent Application No: 71 086 45 mentioned above, dead time is that time during which a pair of mirrors comes into position to replace the pair which have just been scanning a line. It has already been admitted that during the dead time the successive columns are entirely black. The appearance of almost blank columns after the dead time indicates the beginning of the working period. At the end of the line, after the last character has been scanned, there are first of all almost blank columns and then columns containing more than one black as the dead time begins.

In the working period, when $Q_3 = 1$, counter $C_1$ moves up by one unit at each beat of the clock H when $g = 0$. Beginning with an almost blank column which is preceded by a column which is not so, and having been initially set to 9, it sends out a signal $m_1 = 1$ when it has 1 in all positions, i.e. after the 21st almost blank column, and returns to 0. It also returns to 0 when $g$ changes to the 1 state. This counter $C_1$ also operates in the $Z^i$ zones (see above) where no reading takes place, due to a signal $p^i = 0$. When $Q_3 = 1$ and $g = 1$, line $s_1$ coming from gate $P_{11}$ (FIG. 8) is at 1. Counter $C_2$ is then activated. It is set initially to 0 and reset to 0 at the first almost blank column, or at the end of a line, when $Q_3 = 0$. The number indicated by $C_2$, if less than 22, shows that it is indeed a character of width $l$ which is concerned. If $l \geq 22$ it is not a character which is concerned.

The comparator $S_1$ gives out a signal $d_1 = 1$ when the number indicated by $C_2$ reaches 22. Flip-flop $B_1$ changes to 1 each time $d_1 = 1$ and remains at 1 until $g=0$. A signal $S_2 = 1$, which indicates the end of a character, is emitted when gate $P_{12}$ is open, i.e. when $Q_3 =$ 1, whereas, at a previous period T, g was 1, and Q = 0 when g = 0 (the preceding column contains at least two blacks).

The choice of columns to be picked out to identify the character, as well as the actual selections and their switching to the registers $R^i_2$ ($i = 0,1,2,3,4$) in FIG. 3 are the responsibility of a member $V_4$ (FIG. 3) termed the column selector. A diagram of this member is shown in FIGS. 9 and 10 taken together. FIG. 9 shows how the columns are selected on the basis of the width $l$ of the character. The number $l$ is presented at the output of the framing device $V_3$ when a signal $F_1 = 1$ appears (FIG. 8) and it thus appears at the input to the "one from eight" decoder $\Delta_1$ in with $V_4$, the outputs of which are numbered 0 to 7. The most significant bit in $l$ is ignored.

At the output of $\Delta_1$, line 1-16 is in the 0 state and all the others in the 1 state. For each value of $l$, the positions of the columns to be selected are represented by lines perpendicular to those already mentioned coming from the output line of $\Delta_1$ in the 1-16 position and running via NOT-AND gates or inverters, to the inputs of register $R_4$. This 21 bits register has its inputs in parallel when $s_2 = 1$ and operates as a shift register when $s_5 = 1$. The unused inputs of $R_4$ are set to 0.

The circuitry of register $R_4$ with the gates and inverters it requires is laid out on a board which can be interchanges to suit the alphabet in question and which has 20 input lines and 20 output lines. The connections shown in FIG. 9 are those for the alphabet here concerned and there are five gates and ten inverters. It will be remembered that in the present case it is only the columns in positions $l$ and $l-1$ which need to be selected for thin characters. For characters of normal width these are added the central column, the position of which is equal to the largest whole number contained in $(l-1)/(2)$, and then the columns whose positions correspond to the largest whole numbers contained in $(l+1)/(4)$ and $(3l-5)/(4)$.

When the signal $s_2 = 1$ is emitted from $V_3$, the positions of the columns to be selected, which are indicated by 1's at the inputs to the flip-flops in the same positions in $R_4$, are switched to the output of these flip-flops. When $s_1$ changes to 1, the first column containing more than one black (column number 0 of the character) is switched to the outputs of the first row of flip-flops in $V_2$ (possibly at location 2 if the components used are not fast enough, although in this case provision must be made for suitable delays). The first words emerging from $V_2$ begin to be selected when the second column in the character arrives at the output. This takes place at a time 24T after the first column is fed in, and thus at a time 23T after the beginning of signal $s_1 = 1$ (or possibly 24T). It should be pointed out that, in the case of a thin character, at this latter time the columns for the next character will already have been fed into $V_2$. Two counters $C_4$ and $C_5$ (FIG. 10) which sometimes operate simultaneously, are required to select the output signals from $V_2$ at the desired point in time. They begin to count alternately each time $s_1$ changes to 1. Counter $C_4$ for example, will have moved up by 21 units (or possibly 20) when column No 1 of the character is at the outputs of the 23rd flip-flops in $V_2$. The five-bit counter $C_4$ is set initially to 11 so as to supply a signal $m_4 = 1$ which causes column 1 of the character to be transferred to register $R^1{}_2$, at the output of which it arrives a period T later. The means which actuate $C_4$ and $C_5$ alternately are as follows:

Flip-flop $B_4$ gives a signal $\overline{Q}_4 = 0$ except at a time T after each change-over of $S_1$ from 0 to 1, at which time $\overline{Q}_4 = 1$. The result is that $B_5$ changes over each time and directs a 1 signal alternately to $J_6$ or $J_7$ (from $B_6$ and $B_7$), this signal being prolonged until $m_4$ or $m_5$ gives a 1 signal. Output $Q_6$ of $B_6$, for example, activates $C_4$, which counts to 20 and then emits a 1 signal at output $m_4$ ($C_4$ and $C_5$ give the desired signal when they reach 31).

At the signal $m_4 = 1$ the second column of the character (numbered 1) arrives at location 23 in $V_2$. The selection process begins at time T after this if in fact it is the character which is concerned, i.e. if the signal $s_2 = 1$ has appeared. The selection signal $s_4 = 1$ is formed by a gate $P_{13}$ and flip flop $B_8$. The latter is reset to 0 by signal $s_3 = 1$. Signal $s_4 = 1$, given by $P_{14}$, gives rise to a signal $s_5 = 1$ which persists until counter $C_6$ has moved up by $l$ units. For this purpose it is set initially to $31-l$. The signal $s_5 = 1$ actuates the shifting operation in $R_4$ and thus causes the successive bits of $R_4$ to pass in order through line $F_6$. The bits which are equal to 1 actuate flip-flops $D_0$ to $D_4$ in succession and thus supply 1 bits to outputs $q_0$ to $c_4$ of the flip-flops $D_0$ to $D_4$ in $V_4$ (FIG. 10).

Lead $q_i$ ($i = 0, 1,2,3,4$) activates register $R^i{}_2$ in $V^i{}_5$ (FIGS. 3 and 11), which then receives the content of the last column in $V_2$ and presents it at its output having formed its complement (a white being then indicated by a 0).

At a time $l$ T after signal $s_4 = 1$, the selection process finishes. This instant is indicated by a signal $m_6 = 1$ which resets flip flop $B_9$ to 0 and transfers the contents of registers $R^i{}_2$ ($i = 0$ to 4) (FIGS. 3 and 11) to registers $R^i{}_3$. Registers $R^i{}_2$ are thus freed to receive the columns selected for the next character. Registers $R^i{}_3$ are high-speed upward shifting registers which are operated by a clock signal $H'$ the frequency of which is $T/3 = 61.7$ nanoseconds.

Signal $m_6 = 1$ gives rise to a signal $Q_{10} = 1$ which persists until the six-bit counter $C_7$ has moved up by 34 units. For this it is necessary for the counter to be set initially to $63 - 34 = 29$. This counter has to operate at approximately 16 megacycles. Signal $Q_{10} = 1$ produces a shift in registers $R^i{}_3$ at a frequency of $T/3$.

After $\nu$ upward shifts, the bits which appear on $F^i{}_4$ and $F^i{}_5$ (FIG. 11) are those in positions $\nu$ and $\nu+1$ counting downwards from 0 and it is their complementary bits which appear on $\overline{F}^i{}_4$ and $\overline{F}^i{}_5$. When $C_7$ (FIG. 10) reaches 63, it emits a signal $m_7 = 1$ which returns $Q_{10}$ to 0 a period of time $T/3$ later.

As has been stated above, it is necessary to assess the lengths of the successive intervals made up of series of whites and series of blacks in columns $G^i$. The index assumes values 0,1 ..., with $i_0 \leq 4$. In addition, when determining the lengths of these intervals isolated 0 or 1 are ignored. The determination process is the responsibility of members $V^i{}_5$ ($i = 0,1 \ldots, i_0$), which are termed "interval separators" (FIGS. 3 and 11). Member $V^i{}_5$ establishes when black to white and white to black changeovers occur in the sequence of bits $b^i{}_0, b^i{}_1, \ldots, b^i{}_{34}$ which appear on $F_4, F_5$ (FIG. 11) at a frequency of $T/3$. A change-over is recognised to exist when two consecutive blacks are encountered in a white interval or when two consecutive whites are encountered in a black interval. Encountering a single black followed by a white is thus considered equivalent to a continuation of the current white interval and the same applies when an isolated white is encountered in the black interval.

This being so, a black interval always comprises at least two bits and a white interval likewise, except in the case of the first white interval which may be zero, since, by convention, the first interval is always a white one. Any possible intervals beyond the sixth one are ignored.

The bits in positions $v$ and $v+1$ in $G^i$ appear on $F^i_4$ and $F^i_5$ at a time $t_0 + v\, T/3$ ($T_0$ being the time at which $m_6$ is emitted). A 1 or 0 is obtained on $r_1$ depending upon whether $F^i_4$ is or is not equal to $F^i_5$ and a 1 or 0 is obtained on $r_2$ depending upon whether $F^i_4$ is or is not equal to $Q_{11}$.

$r_3 = 1$ when $r_1 = r_2 = r_1$, and $r_3 = 0$ when $r_1 = 0$ or when $r_2 = 0$. A white interval is characterised by $Q_{11} = 0$ and a black interval by $Q_{11} = 1$.

Each time $r_3$ assumes the value of 1, $B^i 11$ changes over and the value of $Q^i_{11}$ alters. A change-over is certainly present.

Counter $C_8{}^i$ is activated by $Q'_{10}$ via $B^i_{13}$. A change-over signal $Q^i_{12} = 1$ is obtained at the output of $B^i_{12}$ which has a delay of $T/3$ with respect to $r_3$. When this signal $Q^i_{12} = 1$ occurs, the number indicated by $C^i_8$ is transferred to the output of register $R^i_4$ where it constitutes the interval length $\wedge\,{}^i_j$ if it is the $j$th changeover which is concerned (counting from $j = 0$). Counter $C^i_8$ is reset to 0 and continues to count. When signal $m_7 = 1$ occurs, indicating the end of the column scan, $C^i_8$ stops counting and the number which indicates is transferred for the last time in $R^i_4$. Flip-flops $B^i_{12}$ and $B^i_{13}$ are reset to 0.

The numbers $\wedge\,{}^i_j$ obtained must now be compared with the fixed numbers $c^i_{jk}$. The time available for this is only $2T/3$, since an interval may have a length of only two bits and a quantity of $\wedge\,{}^i_{j+1}$ may appear in $R^i_4$. The number of $c^i_{jk}$'s $K_0 = 3$ at the maximum when, in the example in question, it is considered sufficient to determine the identity of the characters only once. Otherwise the number would be higher. The member $V^i_6$ which makes the comparisons (FIGS. 3 and 12) is made up of a memory which contains the constants and can be interchanged to suit the alphabet in question, a number $k_0$ of comparators capable of simultaneous operation, and a register which accepts the results of the comparisons.

The memory is a matrix containing six columns corresponding to the six possible successive values of $j$. The column in position $j$ is activated by that one of the lines $r^i_0$ to $r^i_5$ which is at 0, the others being at 1. This column contains $k_0$ group numbered 1, 2, ... $k_0$ from the top, each of which contains six bits with the $k$th grouping representing bits $c^i_{jk1}$, $c^i_{jk2}$, ..., if there are such, the bits themselves being numbered from the top. Each part of the matrix which is shown in FIG. 12 by a square is connected by an output line to one of the gates $P^i_{22}$ (one per matrix row). When $c^i_{jkl} = 1$, this is equivalent to the output line of the appropriate part of the matrix being set to 1. The same applies when $c^i_{jkl}$ does not exist. When $c^i_{jkl} = 0$, this is equivalent to a connection being formed between the output of the part of the matrix and the line $r^i_j$ which activates column $j$ when it is at 0.

As already mentioned, the sixth output lines from one and the same row in the matrix run to the inputs of one of the gate $P^i 22$ these being six-input NOT-AND gates. The outputs of these gates which correspond to the same value of $k$ represent the $c^i_{jkl}$ bits in the number $c^i_{jk}$ and are connected to the first inputs of the comparators $S^i_{2k}$ which are $k_0$ in number. The length $\wedge\,{}^i_j$ of the $j$th interval in $G^i$ is transmitted to the second inputs of the comparators.

A three-bit counter $C_9$ moves up by one unit each time a change-over signal $Q^i_{12} = 1$ occurs and also when the end of scan signal $m_7 = 1$ occurs: it then returns to 0 after a period $T/3$ or when it has counted 6. This counter controls the "one of six" decoder $\Delta_2$, which feeds a 0 to the line which activates the $j$th column in the matrix, and a 1 to the others.

The results of the three comparisons are emitted from the three comparators simultaneously on lines $d^1_{2,1} d^i_{2,2}\, d^i_{2,3}$. $d^i_{2,k}$ is at 0 if $c^i_{jk} \leqslant \wedge\,{}^i_{jk}$ and $d^i_{2,k}$ is at 1 if $c^i_{jk} > \wedge\,{}^i_j$. Lines $d^i_{2,k}$ run to the 6-bit shift registers $R^i_{5,k}$. These registers make a one position shift when a period 2 $(T/3)$ has elapsed after signal $Q_{12} = 1$ or signal $m_7 = 1$. When operations have been completed for column $G^i$, the comparison results are transmitted from the outputs of the registers $R^i_{5,k}$ into the interconnecting matrix $V_7$ (FIGS. 3 and 13).

It is possible to make up a single interchangeable board which combines the two interchangeable boards discussed above plus this matrix. The latter has as many outputs as there are letters in the alphabet (which is 37 in the alphabet envisaged). This number may rise to 60 if the various signs provided with the majority of alphabets are included, or even to 124 if the lower-case letters are added.

Each input lead to the matrix $V_7$ is divided in two, one of which passes via an inverter, so that the complement of the results above are also available. Each character ⋊ which is defined by a single inequality test $S^\varkappa$ has associated with it a NOT-AND gate $P^\varkappa_{23}$, to the inputs of which lead the lines which are at 1 when the equality conditions set by $S^\varkappa$ are satisfied. The output of $P^\varkappa_{23}$ is the output lead of $V_7$ which corresponds to character ⋊ (the characters being shown in FIG. 13 as ⋊ ', ⋊ '', ⋊ '''). For a character ⋊ which is capable of being defined by a number of different tests $S^{\varkappa,1}$, $S^{\varkappa,2}$, there are as many gates $P^{\varkappa 1}_{23}$, $P^{\varkappa 2}_{23}$ as there are inequality tests. The outputs of these gates lead to the inputs of a NOT-AND gate $P^\varkappa_{24}$ which is followed by an invertor the output of which forms the line corresponding to ⋊.

$V_7$ is therefore connected up in accordance with the identification table in FIG. 2. The latter applies to normal width characters for which $l = 17$ to 21; it is as well to add the inequality $\wedge\, 3/2 = (n_{3/4}, 1) > 0$ for all these characters.

For the thin characters, where $l \leqslant 7$, only the second column, which is numbered 1, is selected, this column being contained in register $R^1_3$, the other registers $R^i_3$ remaining at 0. The inequality test $\wedge\, 3/2 >< 0$ will be added, which indicates there is no black in $R^3_3$. Then, for character I, will be added the test $(ng2) > 0$. For character 1 will be added the test $(ng2) = 0$ and $(bg1) \leqslant 8$. For the full stop are added tests $(ng2) = 0$, $(bg1) > 8$ and $(ng1) \leqslant 4$; and for the comma are added test $(ng2) = 0$, $(bg2) > 8$, and $(ng2) > 4$. The number of inputs to gates $P_{23}$ may be as many as 10. An 8-input gate with an expander is then used.

As stated above, it is possible, without altering the circuitry, and by using a suitable interchangeable board which increases the number of comparisons, to use a plurality of processes (3 for example) for distinguishing between the characters. In this case a character is allowed to have been identified if two of the processes or if all three of the processes give the same result; otherwise the character is held to be "not recognised".

If the identification takes place properly, the output of $V_7$ which corresponds to the character recognised is at 0 and the others are at 1.

For the alphabet in question, the output leads are numbered 3,4,5, up to 39 if there are only 37 characters or else up to 60 with the numbers being allotted in an arbitrary manner to suit the desired output code (or up to 124 if the low-case latters are also included).

An "encoder" $V_8$ (FIG. 3), converts the number $N_1$ on the line which is at 0 into its 6-bit binary form, i.e. $A = a^0\ a^1\ a^2\ a^3\ a^4\ a^5$ (the binary form possibly containing seven bits also). Numbers 0,1,2 have special meanings reserved for them. The encoder will not be described since it may be made in a number of ways using known circuits.

However, if the character has not been identified, several of the output leads of $V_7$ may be at 0. This eventuality should result in the final output being character not recognised which may be agreed on as being indicated by a 1 code-sign. In this case, the code sign A which appears at the output of the encoder does not in generally represent any of the characters indicated by zeros at the output of $V_7$. For this eventuality to be recognised, it is merely necessary to replace, at the output of $V_7$ the line $N_1$ which corresponds to the code sign A obtained by a line in the 0 state, and to check whether, among the total number of lines so altered, there is still one which is at 0.

The member $V_9$ which carries out these operations, which is termed as "multiple-output detector", is shown in FIG. 14. It incorporates a 1 of 64 decoder, $\Delta_3$ which receives the code sign A and gives a 0 on line A and a 1 on all the others. Two-input OR gates $P^N{}_{24}$ which are associated with the various possible values of $N_1$ each receive the output lead number $N_1$ from $V_7$; as well as the similarly numbered lead from $\Delta_3$ via an inverter. The output of gate $P^A{}_{24}$ is at 1 whereas the outputs of the other gates $P^N{}_{24}$ wherein $N_1$ is not A are at 0 or 1 depending on whether the output of $V_7$ in position $N_1$ is itself at 0 or 1. The outputs of the gates $P^N{}_{241}$ are connected to the inputs of a 64-input NOT-AND gate $P_{25}$ which gives a 1 if a number of the outputs of $V_7$ are at 0, and a 00 in the opposite case.

As shown in FIG. 15, a 64-input NOT-AND gate may be formed from eight 8-input NOT-AND gates, four 2-input NOT-OR gates, and one 4-input NOT-AND gate.

The code sign of the character obtained at the output of the encoder must therefore be altered at times. This is the function of member $V_{10}$ (FIG. 16).

This member receives $A = \overline{a^0 a^1 a^2 a^3 a^4 a^5}$ from the encoder and gives the definition code as $C = \overline{c^0 c^1 c^2 c^3 c^4 c^5}$. A signal $S_{12} = 1$ indicates that the code C is ready for use. Member $V_{10}$ operates in the following way:

1. if only one 0 appears at the output of $V_7$ then $v = 0$ and gate $P_{27}$ allows the signal $r_{10} = 1$ to pass, code A appears at C and signal $s_{12} = 1$ occurs after a period T.
2. if all the outputs of $V_7$ are at 1, i.e. if $A = 0$ or if the output of $P_{26}$ is at 0, or indeed if more than one output of $V_7$ is at 0, i.e. if $s_{11}$ is at 1, then in every case $v = 1$ and signal $s_{12} = 1$ appears and the code $j^1$, which signifies character not recognised, appears at C.
3. Signals $m_1$ or $d_1$ which come from member $V_3$ and have been delayed by 21 T by a counter $C_{10}$, and then again by 21T by counter $C_{11}$, appear at $b_2$ or $b_3$ and cause a code $j^2$ or $j^3$ to appear at C and also a signal $s_{12} = 1$ after a period T. $j^2$ indicates a "space" and $j^3$ indicates "a series of 22 columns containing more than one black".

A member $V_{11}$ (FIGS. 3 and 17) forms the signals $s_{13}$, $s_{14}$ which cause the output codes C to the directed to the buffer stores $V^1{}_{12}$, $V^2{}_{12}$, included in $V_{12}$ (FIG. 3), the signals $s_{15}$, $s_{16}$ which cause the outputs from the buffers to be fed to the magnetic tape, and the signals $s_{17}$, $s_{18}$, which control the address progression in the buffers both when the code signs are being fed into the buffers and when they are being fed out. This member $V_{11}$ receives the signal $Q_3 = 1$ which signifies the working period, a signal $s_{12} = 1$ indicating that a code sign is ready to be fed into the buffer, and a clock signal $H_2$ at a frequency which is the same as that at which the code signs are printed onto the magnetic tape. These code signs are "words" made up of 6 (or possibly 7) bits plus a parity bit which occur at a frequency of 120,000 per second, i.e. 120 KHz, i.e. a cycle time of 8.33 microseconds, or approximately 45T.

FIG. 18 is a table showing the operation of member $V_{11}$. During the dead time $Q_3 = 0$, from which it may be deduced that $s_{13} = s_{14} = 0$. At the change-over to the working period, $Q_3$ changes over; from 0 to 1, and gate $P_{28}$ opens for a period T; $B_{18}$ changes over; line $r_6$ is at 0 and line $r_7$ is at 1, for example, for one transverse sweep and then $r_7$ is at 1 and $r_6$ at 0 for the succeeding transverse sweep, and so on. Consequently, signal $s_{12} = 1$ is transmitted to $s_{13}$ during one transverse sweep, to $s_{14}$ during the subsequent transverse sweep, and so on.

As regards the signals $s_{15}$ and $s_{16}$ which control the outputs of the buffers, $s_{15}$ may be equal to 1 and $s_{16}$ to 0 at the beginning of the dead time which follows the working period in which $s_{13} = 1$, so that the buffer $V^1{}_{12}$ which has just been loaded may begin to be emptied. Similarly, $s_{16} = 1$ and $s_{15} = 1$ at the beginning of the dead time which follows the working period when $s_{14} = 1$. The signal $s_{17} = 1$ for the address progression in $V^1{}_{12}$ should occur each time the signal $s_{13} = 1$ occurs and also each time a clock signal $H_2$ occurs when $s_{15} = 1$. The same applies to $s_{18}$ when $s_{14} = 1$ or when clock signal $H_2$ occurs when $s_{16} = 1$.

The buffer memories $V^1{}_{12}$ and $V^2{}_{12}$ are each formed by eighteen 64-bit modules, each containing 4-bit words separately addressable by four lines. One signal allows read-in and the other read-out (see FIG. 19 which represents half of one of the buffers, that is to say one block of nine 64-bit modules). In the case of the other block, only two modules out of the nine are used in the present case since the code signs are made up of only 6 bits. The counter $C_{12}$ and the 1 of 9 decoder $\Delta$ 4 are common to both blocks of buffer $V^1{}_{12}$. Signal $s_{17}$ causes $C_{12}$ to move up. The four least significant bits select one of the 16 words for each module and the decoder, which is activated by the four most significant bits of $C_{12}$, selects the module. Each module has four read-in lines, four read-out lines one read-in authorisation line and one read-out authorisation line. The two latter lines are connected to $s_{13}$ and $s_{17}$ and are controlled by gates which are also connected to the outputs of decoder $\Delta$ 4. Read-in takes place when $s_{13} = 1$ and $s_{15}$ 0 read-out takes place when $s_{15} = 1$ and $s_{13} = 0$. The read-out results appear at the six gates $P^1{}_{29}$ (only the first four gates are shown in FIG. 19).

The switching device $V_{13}$ (FIG. 20) receives the words C coming from $V_{10}$ and directs them to outputs $A'_1$ when $s'_{13} = 1$ and $s_{14} = 0$, and to outputs $A'_2$ when $s_{13} = 0$ and $s_{14} = 1$. These outputs are connected to the inputs of buffers $V^1{}_{12}$ and $V^2{}_{12}$. The switching device $V_{13}$ is shown as two blocks $V^1{}_{13}$ and $V^2{}_{13}$ in FIG. 3.

Member $V_{14}$ (3 and 21) switches one of the two outputs of the buffers to the magnetic tape transporter in response to signals $s_{15} = 1$ and $s_{16}=0$ in the case of $V^1{}_{12}$ or $s_{15} = 0$ and $s_{16} = 1$ in the case of $V^2{}_{12}$. An interface ($V_{15}$, FIG. 3) converts the output signals of a TTL nature into signals capable of being recorded on the magnetic tape. An extra member not shown in the diagram forms, for each 6 (or 7) bit character the parity bit which will render the magnetic tape compatible with the computer which is to be used.

What has just been described with reference to FIG. 3 and detail FIGS. 4 to 21 is an embodiment of the system for identifying characters which forms the subject of the present invention. No mention has, however, been made of the principle of line framing and how it is put into effect. The following description is given over the explaining this principle and the way in which it is used.

In the non-limiting embodiment described, the scanned areas are circles the distance between whose centres is $d$, which is approximately 4.5 microns (FIG. 1). The pitch $p$ of the text is $35d$. The characters are all of the same height and are aligned with one another, except for the comma which descends a maximum of $4d$ lower. The same would apply to the semi-colon and possibly to certain other characters, but no provision has been made for the latter at the present time. Consequently the character always, in principle, falls within circles number 2 to 34 (the circles are numbered from 0 starting at the top) in the framing interval G, and may possibly encroach onto circles 1 and 35, and, exceptionally, onto circle 0, as well as onto cirlce 0 in the succeeding transverse sweep because of possible deviations and the position of the group of circles relative to the character. The framing interval G should cover the whole of the character with the possible exception of the lower extremity of characters having descenders such as the comma. In effect, the identification algorithm presupposes that no black belonging to the next line of writing will appear in G, whereas blacks from the preceding line may sometimes enter it. The length of G is the same as the pitch $p$, i.e. $35\ d$.

A transverse sweep U is divided into zones $Z^i$ such that the level of the bottom of a normal character does not vary more than $(d/2)$ between the beginning and the end of the zone. As has already been seen, for a single line of writing, the framing indicators for the different zones will differ by a maxumum of 12 units.

From one transverse sweep to the next, the film advances by a distance closely approximating to pitch $p$. It has also been conceded that slope does not vary substantially where the value of $i$ is the same. Consequently, where the value of $i$ is the same, the framing indicator $E^i$ also does not vary substantially from one transverse sweep to the next, that is to say, it varies by a maximum of one unit or, in an exceptional case, by two units. The variations in $E^i$ when the value of $i$ is the same in successive lines of writing are what will enable the speed at which the film is fed up to be corrected. There are good reasons for using this purpose a variation which is averaged out from the various zones in which the indicator is established. It may, however, be that there is no indicator in certain zones due to the presence of whites. It may be allowed that, from one transverse sweep to the next, the amount by which the film is fed up does not differ from the pitch $p$ by more than $d/8$, which results in a maximum relative speed variation of $1/(8 \times 35) = (1/280)$.

No more space will be devoted to the details of how these speed corrections are produced. For them to remain usable in absolutely exceptional cases, it will be necessary to increase the height of the scanning band to, for example, four lines of writing instead of 2¾ lines so that the framing interval is always contained within the band being scanned. Such exceptional cases will be ignored in the present description.

In the course of a transverse sweep U, there are two possible eventualities, depending upon the information collected in the course of the preceding transverse sweep U⁻:

a. no reading is to take place,
b. reading takes place in certain zones, provision being made for reading in zone $Z^i$ to take place with a framing indicator $E^i$ established in the course of U⁻.

In either case it is necessary to collect information during the course of transverse sweep U which will show whether the next transverse sweep U⁺ will give a read-out in certain zones $Z^i$ and, if so, what indicator $E^i$ is to be adopted for each zone.

The item considered for this purpose is the word formed by the bits in the $k$th column in zone $Z^i$, when restricted to the first 64 bits counting from the bottom, i.e. $B^k = (b^k{}_0, b^k{}_1, \ldots b^k{}_{63})$. Supposing $p_j$ to be equal to 1 if, in the case of a certain $k$, $b^k{}_j = 1$, and $p_j$ to be equal to 0 if all the $b^k{}_j$ in the zone $Z^i$ are 0. The word $p=(P_0, P_1, \ldots P_{63})$ is the profile $\pi^i$ of zone $Z^i$.

The profile $\pi^i$ is made up of black or white intervals. Beginning from the bottom, the "first white interval" extends to and includes the first white which is followed by two consecutive blacks. It does not exist if the first two bits are black. The "first black interval" begins from the first of the two black bits in question and runs to the first black which is followed by two consecutive whites. It may possibly not exist. If applicable, the second, third and so on black intervals or white intervals may be defined in the same way.

If the text contains borders formed by vertical lines which nowhere touch any character, it is as well for these to be eliminated. They give rise to a succession of 64 bits words the form of which is shown in FIG. 22 in which B signifies an almost blank column, BN signifies a column containing white and more than one black and N signifies an entirely black column.

It is best to ignore the words in this series which contain more than one black when the blacks in zone $Z^i$ are combined to obtain profile $\pi^i$. The same applies if this configuration spreads over the zones.

It is as well to separate out those of the black intervals in profile $\pi^i$ which are too short for the line of writing from which they originate to contain at least one character of normal height in zone $Z^{i.}$ What may be concerned are, for example, border lines or underlinings. Since the theoretical height of a normal character is $29d$, it may be conceded that, in certain cases, it will be two bits less than this, which results in black intervals shorter than $27d$ being eliminated, with the exception of the first black interval if it begins at the bottom since, in this case, it may belong to a character situated entirely within $Z^i$ even though it only contains 2 bits.

Having thus eliminated certain black intervals, consideration will now be given to the first, still beginning from the bottom, of those remaining and the position of its top bit will be referred to as $N^i{}_1$. The next interval considered is the second one, anf if the position of its top bit is lower than 63, and this position will be referred to as $N^i_2$. (It should be remembered that if $N^i_3$ were to be defined in the same way, it would be a number which would never exist).

The interval or intervals picked out in this way correspond to a line or writing for which the framing indicator (for the following transverse sweep) is $N^i_1 + 3$ or $N^i_2 + 3$.

No consideration is given to the case where no character appears during the transverse sweep U below the lines already read.

The framing operation will differ somewhat in two cases A and B. First to be considered is case A. No reading takes place in the course of transverse sweep U, but a line of writing appears at the bottom of the band being scanned. So that the whole of this line may be read during the next transverse sweep $U^+$, it is first of all necessary for the whole of it to appear in the band being scanned after a $35d$ feedup has taken place. The positions of the top bits for the characters of normal height in this line may, however, differ from one another by 12 units. Furthermore, if the speed at which the film moves is too slow, the position of the lowest bit will sink even further in the course of subsequent transverse sweeps. It is therefore necessary to detect this drop, to issue a speeding-up order, and for this order to be carried out.

To detect too slow a speed, it is necessary, in a series of transverse sweeps of type B, to find two indicators $E^i$, $E^j$ ($j > i$) such that $E^j - E^i$ is more than 12. It may, for example, be laid down that $E^j - E^i \geq 14$. It is therefore necessary, during a transverse sweep of type A, to make provision for an indicator $E^i \geq 19$, which allows for the fact that the indicator may again be reduced by two units while the speedingup order is being carried out and which reserves three bits for the framing information for the transverse sweep following the increase in speed.

Thus, if a line of writing gave an indicator which is $\leq 18$, it would be necessary to wait for the following transverse sweep, in which the same characters will give an indicator $\leq 18 + 35 = 53$ (or 54 if there is a slight divergence, which is always possible). In the extreme case, the framing band will occupy bits 54 to 89.

If the speed at which the film moves is now too great, this can only be established with certainty when the indicator has increased by 16, which brings the frame interval up to 95. It is for this reason that $96d$ was adopted as the height of the scanning band.

If M is the highest of the numbers $N^i_1$, $N^i_2$ which exist for a transverse sweep U, this maximum being achieved for a certain value $i_0$ of $i$, $E'^i$ is assumed to be equal to $M+3$. This framing is valid, as seen above, if $E'^i \geq 19$, or if $$M \geq 16 \quad (1)$$

An indicator $E^i$ is then allotted to those of the zones $Z^i$ for which the number $N^i_2$ (or the number $N^i_1$ if there is no $N^i_2$) differs from M by a maximum of 12 units.

$$M - N^i_2 \leq 12 \quad (2)$$
$$M - N^i_1 \leq 12 \quad (3)$$

One of the conditions is assumed to be satisfied. $E^i$ is made equal to $N^i_2 + 3$ if it is (2) which is satisfied and to $N^i_1 - 3$ if it is (3) which is satisfied. If none of conditions (1), (2), or (3) is satisfied, there will be no indicator for $Z^i$ and therefore no reading in this zone during transverse sweep $U^+$.

Case B will now be considered. Reading takes place in the course of transverse sweep U. There is therefore available at least one frame indicator E which will have been established from the information collected during transverse sweep $U^-$. The indicators to be established during U, which will be used during $U^+$, differ from E by a maximum of 12+2 units (the two units originating from possible deviations). On the basis of the foregoing, the indicator $E^i$ is equal to $N^i_1 + 3$ or $N^i_2 + 3$ and one of the following conditions should therefore exist:
$$|E - N^i_1 - 3| \leq 14$$
or
$$|E - N^i_2 - 3| \leq 14 \quad (4)$$

If neither of these two inequality relationships is satisfied, there is no $E^i$ in zone $Z^i$. It should be noted that the two inequality relationships (4) cannot be satisfied simultaneously otherwise $N^i_2 - N^i_1$ would be equal or or less than 28 and $N^i_2 - N^i_1$, which is theoretically equal to 35, may not differ from this Figure by more than 2 units and its least value is therefore 33.

If $N^i_1$ exists, and if $|E - N^i_1 - 3| \leq 14$, the indicator selected is $E^i = N^i_1 + 3$.

If $N^i_2$ exists and if $|E - N^i_2 - 2| \leq 14$, the indicator selected is $E^i = N^i_2 + 3$.

When no framing information has been obtained for a zone $Z^i$, but such information has been obtained for zone $Z^i+1$, or for zone $Z^{i+1}$, the framing for this adjoining zone is extended to $Z^i$. If framing information had been obtained both $Z^{i+1}$ and for $Z^{i-1}$ that for $Z^{i-1}$ is, for example, selected. It may, in fact, happen that a character of normal height is situated partly in zone $Z^i$ or that a shorter character than normal (the comma, the full stop, the equals sign, for example) falls entirely within this zone. This extension of the framing enables the character to be read. If a character which is shorter than normal is situated in a zone in which there is no character of normal height, and if there has been no framing subsequent to the extension to this zone, the character is ignored. This would be the case with, for example, a series of points of suspension.

Finally, if, when the scanning of a zone has been completed, a character remains unfinished, reading will continue into the next zone using the same indicator. The new indicator will come into use once this character has been fully scanned.

There will now be described the electronic circuits which enable the line-framing algorithm which has just been explained to be put into practical effect. Member V in FIG. 3 forms this part of the apparatus and it may be divided into six sub-units $V_{16}$ to $V_{21}$ diagrams of which appear in FIGS. 24 to 31. A diagram of the connections between these sub-units appear in FIG. 23.

Sub-unit $V_{16}$ (FIG. 24) establishes, during a transverse sweep U, the profile $\pi^i$ of zone $Z^i$ by restricting each column to its 64 lower bits. It then emits a signal $s_{19} = 1$ which indicates that $\pi^i$ has been obtained; it moves up by an amount equivalent to $\pi^i$ so as to present the successive bits of this word at its output and it all the time indicates the position of the bit in the word $\pi^i$ which is present at its output. It gives a signal $m_{15} = 1$ at the end of the $\pi^i$ shift.

The profile $\pi^i$ of zone $Z^i$ is formed by register $R_6$, which has parallel inputs and outputs. This register receives the bits 0, 1, 2 ..., 63 in each of the columns J. By means of the AND gates with which its inputs are provided, it combines the bit which appears at its output and that which is fed to its input. Each time a signal is emitted by the clock H forming the complement to clock H, and assuming that $Q_3 = 1$, the combination obtained at the inputs to $R_6$ passes to the outputs of this register. If $t_0$ is the time at which the working period begins, at which time $Q_3$ changes from 0 to 1, the profile $\pi^i$ is obtained at time $$[t_0 + 128 (i + 1) - 1] T; (i = 0, 1, 2, \ldots 20)$$

The profile $\pi^{22}$ is obtained when the last character in the line is scanned. It is transferred to register $R_7$ by means of the signal $s_{19} = 1$ the production of which is to be described. $R_6$ is immediately reset to 0 by a flip-flop D which is operated by this same signal $s_{19} = 1$.

The counter $C_{13}$ moves up by one unit for each period T. It is activated when $Q_3 = 1$, i.e. in the working period, and produces a signal $m_{13} = 1$ each time it reaches 127. It is reset to 0 a period T after $Q_3$ has returned to 0 by means of a flip-flop D and gate $P_{30}$. Signal $m_{13} = 1$ give rise to a signal $s^i_{19} = 1$ when $i = 0, 1, 2 \ldots, 20$. Each of the signals $s^i_{19} = 1$ gives a persistent signal $Q_{24} = 1$ via the flip-flop $B_{24}$, this signal causing register $R_7$ to shift. The successive bits in this register pass successively to the first two flip-flops $D^0$, $D^1$ in R7. A signal $m_{14}$ from Counter $C_{14}$ indicates at any given time the position of the bit present at the output of $D^0$. When the last bit appears in this way, a signal $m_{14} = 1$ is emitted and $C_{14}$ and $B_{24}$ are reset to 0.

The possibility exists of what is ready including continuous vertical lines covering the whole height of the scanning band. These may be borders for example. The columns corresponding to these lines will be formed entirely from blacks but may be bordered on the left and right by a column containing black and white and then by entirely white columns. It is as well to ignore these black, or white and black, columns when forming a profile $\pi^i$.

FIG. 25 shows a possible circuit ($V'_{16}$) for this modification. Register $R_6$ in FIG. 24 is preceded by a register $R_8$. A NCT-AND gate $P_{31}$ connected to the 64 lines used for framing, which have their complements formed so that the blacks are equivalent to 1, gives a 0 at its output $r'_4$ if the 64 lines are at 1 (i.e. if they represent a black) and only if this is the case. The flip-flops $D_7$ and $D_8$ transmit from $q_7$ and $q_8$ the value of $r'_4$ at subsequent times T and 2T. An NOT AND gate $P_{32}$ which is followed by an inverter, gives a 0 at its output if and only if its three inputs are at 1. The result is that the word at the output of $R_8$ does not pass to the input of $R_6$ when the columns in question are to be eliminated on account of the vertical line.

Member $V_{17}$ (FIG. 26) performs the following functions:

It receives the successive bits forming the profile $\pi$ of zone $Z^i$. The $\nu$th bit in this profile appears at $s'_0$, while the $(\nu + 1)$ th bit appears at $s'_1$. The number $\nu$ is present at input $n_{14}$. It will be recalled that, when determining the black and white intervals in $\pi^i$, no account is taken of isolated blacks and whites. If $\pi^i$ includes at least one black interval and if the first black interval beginning from the lowest one $J^i_1$, either starts with bit 0 or 1 or is more than 27 bits in length but does not extend past the bit in position 61, the highest bit in $J^i_1$, i.e. $N^i_1$, having been increased by 2 or 3, is recorded in $R_9$ and line $\delta_1$ changes from 0 to 1. If $\pi^i$ includes a second black interval $J^i_2$ which does not extend beyond position 61 and is more than 27 bits in length, then the bit in the highest position in $J^i_2$, i.e. $N^i_2$, having been increased by 2 (or 3) is recorded in $R_{10}$ and line $\delta_2$ changes from 0 to 1.

The signals $\delta^i_1$, $\delta^i_2$ on lines $\delta_1$ and $\delta_2$ persist until the next signal $s^i_{19} = 1$ occurs to indicate the end of a zone-scan and, when $i = 21$, until a signal $s^{22}_{19}$ occurs which persists until the beginning of the next transverse sweep. If input $\zeta$ is at 1, and if $J^i$ exists it is $N^i_1 + 2$ which appears at output $S'_1$; if $J^i_1$ does not exist, $S'_1$ is at 0. If input $\rho$ is at 0 and if $J^i_2$ exists, it is $N^i_2 + 2$ which appears at output $S'_1$. If $J^i_2$ does not exist, $S'_1 = 0$.

Member $V_{17}$ operates as follows: flip-flops $B_{25}$, $B_{26}$, $B_{27}$ and gates $P_{35}$ to $P_{41}$ recognise the black/white transitions when profile $\pi^i$ is run through. At the beginning of shift, $B_{27}$ was reset to 0 by signal $s^i_{19} = 1$ ($i = 0,1 \ldots 22$). If, at time $t$, $s'_0 = S'_1$ then $q = 1$ at time $t + T$ and, if $s'_0$ is not equal to $s'_1$ then $q' = 0$ at time $t+T$. If then $s_0 = s_1 = 1$ and $Q_{27} = 0$, then $q' = 1$ and $B_{27}$ changes over. The first time that this state of affairs occurs is at the transition from a white interval to a black interval, unless $\pi^i$ begins with two black intervals. During the black interval $\nu = 0$ and $Q_{27} = 1$. The black interval continues until $s'_0 = s'_1 = 0$. At this time $S^i_{19} = 1$ and a 1 signal is obtained at $u$. To sum up, $Q_{27} = 0$ if $s'_0$ and $s'_1$ correspond to a white interval and $Q_{27} = 1$ in the opposite case. Each time a black/white transition occurs, which is signalled by the appearance of an $s'_0 = s'_1 = 0$ pair following a black, a 1 signal appears at $u$. It should be pointed out that an interval, be it black or white, may be formed by only 2 bits.

Signal $u' = 1$ occurs when $u = 1$ although, with an extra provision, namely that gate $P_{43}$ should be giving a 1 signal. For this it is necessary either that counter $C_{15}$ should have supplied a signal $m_{15} = 1$ at least a period T earlier, this signal $m_{15} = 1$ being maintained by flip-flop $B_{31}$, or that signal $Q_{28} = 1$ should be present at the output of $B_{28}$.

Counter $C_{15}$ is activated by signal $Q_{27}$ and thus operates during the black intervals. It is set initially to 4 and has 5 bits, with the result that it emits signal $m_{15} = 1$ when it has counted $31 - 4 = 27$. This signal $m_{15} = 1$ is maintained at the output of $B_{31}$ until this flip-flop has been reset to 0 by the following signal $s_{19}^{i+1} = 1$. Counter $C_{15}$ is reset to 0 by signal $u = 1$.

As regards signal $Q_{28} = 1$, it is intended to validate signal $u' = 1$ when $\pi^i$ starts with two blacks. It comes from a three-input gate $P_{42}$ one of whose inputs is connected to $s'_0$, another to $s'_1$, and the third to a signal $\zeta'$ = 1 which is simply signal $s^i_{19} = 1$ which has been delayed for a period T by a flip-flop D. It should be noted that $B_{28}$ is reset to 0 by the output of gate $P_{41}$, this gate being activated when there is a white interval and when, in addition, $s^i_{19} = 1$. Signal $u' = 1$ thus indicates the end of a black interval of at least 22 bits or one which begins at bit 0. This interval may not extend as far as bit 62, otherwise there would be no signal $s^i_{19} = 1$.

When the first signal $u' = 1$ arrives from the profile $\pi^i$, $B'_{29}$ supplies a 1 signal after a period T, which causes $\delta_1$ to change from 0 to 1. $B_{29}$ supplies a 1 to the input to gate $P_{45}$ and the gate, if $u' = 1$, produces a signal $u_1 = 1$ which causes $N^i_1 + 3$ to pass to the output of register $R_9$. $B_{29}$ is reset to 0 by signal $s_{19}^{i+1}$. If a second $u' = 1$ signal occurs while $\pi^i$ is passing through, gate $P_{46}$ opens and gives a signal $u_2 = 1$. The action of the latter is to cause $N^i_2 + 3$ to pass to the output of register $R_{10}$ and, via flip-flop $B_{30}$, to cause $\delta_2$ to change from 0 to 1. This flip-flop $B_{30}$ is reset 0 by $s_{17}^{i+1} = 1$.

As can be seen in FIG. 26, depending upon whether $\phi = 1$ or 0, it is either $N^i_2 + 3$ (if it exists) or $N^i_1 + 3$ (if it exists) which appears at output $S'_1$.

Unit $V_{18}$ (FIG. 27) forms the framing indicator $E^i$ which will be used for a zone $Z^i$ in the subsequent transverse sweep. What is in fact formed first is a provisional indicator $E'^i$ which is subject to subsequent modification.

Let it be assumed that a certain zone $Z^i$ is being read during transverse sweep U. There is then a framing indicator $\bar{E}'^i$ for this zone which is obtained during the preceding transverse sweep $U^-$. It will be seen that unit $V_{21}$ selects on such $E'^i$ if there are several and directs it to the present unit $V_{18}$. The indicator so selected will be referred to as $\bar{E}$ with no index number. If it is assumed that a black interval $J^i_1$ of length $N^i_1$, or two black intervals $J^i_1$ and $J^i_2$ of lengths $N^i_1$ and $N^i_2$ have been obtained for zone $Z_i$ in the present transverse sweep, it should be ascertained whether this length, or one of these two lengths, satisfies one of the inequality conditions $$|\bar{E} - N^i_1 - 3| \leq 14 \quad (1)$$
$$|\bar{E} - N^i_2 - 3| \leq 14 \quad (2)$$

These are written out:
$$\bar{E} - 14 \leq N_\alpha{}^i + 3 \leq \bar{E} + 14, (\alpha = 1,2)$$

The adder $A_1$ in $V_{18}$ will supply the sum
$$A = \bar{E} + (64 - 14) \text{ if } Q_{37} = 1, Q_{38} = 0$$
or
$$A = \bar{E} + 14 \text{ if } Q_{37} = 0, Q_{38} = 1$$

It is merely necessary to feel appropriate values to the inputs of gates $P_{47}$ as shown in FIG. 27. Both number $A'$, which is equal to $A$ if $A < 64$ and to $A - 64$ if $A \geq 64$, and number $B = N^i + 3$ appear at the inputs of comparator $S_3$. The latter supplies a signal $d_3 = 1$ or 0 depending upon whether $A' \leq B$ or $> B$. This signal appears at one input of $P_{47}$ while a signal $Q_{37}$ appears at the second input of this gate. A signal forming the complement of $d_3$ appears at one input of $P_{49}$ while $Q_{38}$ appears at its second input. The conclusion is that inequality test (1) is satisfied if $\phi = 1$, while $Q_{38} = 1$ if there is a 1 at the output of $P_{49}$ when $Q_{27} = 0$, and $Q_{38} = 0$ if there is a 1 at the output of $P_{48}$ when $Q_{37} = 1$, $Q_{38} = 0$. Since these signals persist at the outputs of $B_{33}$ and $B_{32}$, the fact of the inequality test (1) being satisfied results in a 1 signal at the output of $P_{50}$. The same applies in the case of inequality test 2 when $\phi = 0$.

The behaviour of unit $V_{18}$ in time is therefore as follows: let 0 be the time at which signal $m_{15} = 1$ arrives signifying the end of shift. At time T, a 1 signal appears at the output of $B_{36}$. It is maintained until time 21T. At time 2T, counter $C_{16}$ begins to count and continues to do so at a frequency T. It actuates the 1 from 20 decoder $\Delta_5$. At time $mT$, the decoder gives out a 0 on line $fm^-_2$ and a 1 on all the others. If $\delta^i_1 = 0$, which means that $\delta^i_2 = 0$, lines $f_0$ to $f_{17}$ of $\Delta_5$ do not act. If $\delta^i_1 = 1$, at time 4T, $f_2 = 0$ and hence there is a 1 at the output of $B_{37}$, i.e. $Q_{37} = 1$. Between time 5T and time 8T, $Q_{38}$ is at 0 and $\phi$ is at 1. The result is a 1 or a 0 at the output of $B_{32}$ depending on the result from comparator $S_3$.

At time 7T, $f_5 = 0$. Consequently, $Q_{37}$ returns to 0 at time 8T and $Q_{38}$ assumes the value 1 via $B_{38}$. A 1 or a 0 is then obtained at the output of $B_{33}$ depending on the result from $S_3$. To satisfy the inequality test (1), it is necessary and sufficient that the outputs of $B_{32}$ and $B_{33}$ be at 1, which results, after a time T, in a 1 at the output of $B_{34}$ i.e. at $k_2$.

At time 10T, a 1 signal arrives at input $K_{38}$ and resets $Q_{38}$ to 0 at time 12T. At time 12T, line $f_{10}$ is at 0. Output $Q_{32}$ is reset to 0, a 1 arrives at the input of $J_{39}$, and at time 13T a 1 arrives at the output of $B_{39}$ which makes $p = 1$.

In the period from 13T to 18T, if $\delta^i_2 = 0$, $\Delta_5$ controls nothing. If on the other hand $\delta^i_2 = 1$, the same series of operations takes place as from 4T to 10T except that $p = 0$, the effect of which is to bring $N^i_2$ into play in place of $N^i_1$. To satisfy inequality (2), it is necessary and sufficient that there be a 1 at the output of $P_{50}$. At time 20T, $P_{35}$ is activated. Output $Q_{34}$ of $B_{34}$ is fed to output $Q_{35}$ of $B_{35}$ and $Q_{35}$ becomes equal to 1 if $J^i_1$ exists, and if and only if inequality test (1) is satisfied. At the same time $Q_{34} = 1$ if $J^i_2$ exists and if inequality test (2) is satisfied.

At time 22T, $B_{36}$ is reset to 0 and at time 21T, $\phi$ resumes the value at output $\phi_1$ of $P_{67}$. At the same time counter $C_{16}$ ceases to operate and returns to its initial setting. (It is set initially to 10 so as to reach a maximum at 21).

Sub-unit $V'_{18}$ (FIG. 27 the rectangle in broken lines) receives signals $\delta^i_1$, $\delta^i_2$, $Q_{34}$, $Q_{35}$ as well as a signal $\lambda$ coming from unit $V_{19}$ which indicates whether or not reading has taken place in the course of the preceding transverse sweep $U^-$. Thus sub-unit forms the signals $\phi_1$ and $p$ by means of which a provisional framing indicator $E'^i$ will be obtained for the zone $Z^i$. What is signified by signal $p$ is as follows: If $p = 0$ there is no indicator $E'^i$. If $p = 1$, indicator $E'^i$ exists and is equal to $N^i_1 + 3$ if $\phi_1 = 1$ and to $N^i_2 + 3$ if $\phi_1 = 0$.

Sub unit $V'_{18}$ carries out the operations indicated in the truth table in FIG. 28.

Unit $V_{19}$ (FIG. 29) receives each of the indicators $E''$ contained in unit $V_{18}$ for each $i$ for which $p = 1$ (signal $p^i$). From these results it forms the largest of the $E'^i$ s, the signal $\lambda$ already used in $V_{18}$, and other signals intended for use in units $V_{20}$ and $V_{21}$. (FIGS. 30 and 31).

Unit $V_{19}$ operates as follows: in the course of a transverse sweep U, if the state of affairs is that termed A, which is the case where no reading is expected during the transverse sweep in question, the signal remains equal to 0. If on the other hand the state of affairs is equivalent to case B, where there is something read in at least one zone in the course of the transverse sweep $U^-$, signal $\lambda$ remains equal to 1. Unit $V_{19}$ forms the highest M of the indicators $E'^i$ for those values of $i$ for which signal $p^{i=1}$ occurred. A time 22T after the signal $m_{15} = 1$ which follows the scanning of zone $Z^i$, number $E'^i$ is present at $S'_1$. Signal $S_{19}$ then causes $Q_{41}$ to be equal to 1, which results in $E'^i$ appearing at $b_4$, which is one of the inputs of comparator $S_4$. At its other input $d_4$ this comparator receives the word $M^{i-1}$ which register $R_{11}$ supplies at its output. It emits a signal $d_4 = 1$ when $E'^i \geq M^{i-1}$ and a signal $d_4 = 0$ in the opposite case. At a time 3T after signal $s_{19} = 1$, $Q_{42}$ becomes equal to 1, which results in gate $P_{70}$ becoming conductive and activating register $R_{11}$, provided that $p^i = 1$ and $d_4 = 1$. Register $R_{11}$ then has $E'^i$ at its output if $d_4 = 1$ and its output signal remains unchanged if $d_4 = 0$. Its output is thus the larger of the two numbers $E'^i$ and $M^{i-1}$. Since register $R_{11}$ was reset to 0 before the beginning of transverse sweep U by signal $Q_{43}$ (the formation of which will be described below), after each zone $Z^i$ this register indicates the largest of the numbers $E'^j$ for all the $j \leq i$'s for which $E'^j$ exists.

A time 3T after the end of the 22nd zone (where $i = 21$), $Q_3$ becomes equal to 0, since it is then the dead time, and a signal $r_5$ is emitted by $P_{74}$. This signal $r_5$ switches a fixed number ($= 18$) to input $b_4$ of comparator $S_4$. At this moment the largest M of the numbers $M^i$ is present at $a_4$, and $d_4$ is at 1 or at 0 depending upon whether $M \leq$ or $> 18$. If one of the $p^{i''}$ s ($i = 0, 1,$ ..., 21) is equal to 1, flip-flop $B_{45}$ makes $Q_{45}$ equal to 1. The process for forming λ will now be described. Signal $Q_{42} = 1$, which appeared 3T after $s_{19} = 1$ (end of zone) from $R_3$, arrives at gate $P_{74}$ from which emerges a signal $r_5 = 1$. This signal passes to gate $P_{75}$ which also receives $Q_3$. This gate gives a signal $r_9 = 1$ which signifies that reading will take place in the course of the next transverse sweep.

The first case to be considered will be case A (where there is no read-out in the course of transverse sweep U) (λ = 0). Flip-flop $B_{47}$ is at 0, which means that $\overline{Q}_{47}$ is 1 and that there is a 1 at the input of $P_{75}$, which also receives signal $\overline{Q}_3$, signal $\overline{d}_4$ and signal $Q_{45}$. In this way a signal λ + is produced which, at a time 2T after signal $\overline{Q}_3 = 1$ (flip-flop $B_{46}$ and $b_{47}$) replaces λ. The next case to be considered is case B (λ = 1). Flip-flop $B_{45}$ is at 1, which means that there is a 1 at the input of $P_{71}$, which also receives signals $Q_{45}$ and $r_5$. A signal $λ^+$ is thus obtained a time 2T later.

Signal $r_5$ is maintained at $Q_{48}$ by flip-flop $B_{48}$ which actuates the 7-bit counter $C_{17}$ at the period T, the counter being initially set to 0. It then emits a signal $m_{17} = 1$, which is maintained at $Q_{43}$ by flip flop $B_{43}$. Gate $P_{73}$ gives a 1 signal when $Q_{43} = 1$ or when $Q_{42} = 1$ (at a time 3T after signal $s_{19}$ which corresponds to the end of the scanning of zone $Z^i$). It will be noted that signal $Q_{43} = 1$ is equivalent to the end of scan in an imaginary extra zone the usefulness of which will become apparent later. It should be noted that signal $p'^i$ is equal to $p^i$ whilst $i ≤ 21$ and that it then becomes equal to 0 for the imaginary zone $i = 22$ due to signal $Q_{43}$. A time T later signal $Q_{43}$ resets flip-flops $B_{44}$ and $B_{43}$ to 0 and flip-flop $B_{48}$ resets counter $C_{17}$ to its initial setting. Signal $Q_{43} = 1$ resets flip-flop $B_{45}$ to 0 (FIG. 29).

The maximum value M of the $E'^{i \cdot s}$ obtained at the output of register $R_{11}$ should pass to the output of $R_{12}$ under the following conditions; $M > 18, \overline{λ} = 0$. For this, gate $P_{72}$ receives signals $Q_{43}$, λ and $d_4$. It should be noted that signal λ only becomes $λ^+$ after a further period. T.

Unit $V_{20}$ (FIG. 30) receives the provisional framing indicator $E'^i$ formed in the course of a transverse sweep U and reconstitutes them, possibly in modified form, at the required time for them to be used during the following transverse sweep $U^+$. This unit also receives signals $p'^i$, the signal $s_5$ corresponding to $Z^i$ (termed $s^i_5$) which is formed by $V_{19}$, and the signal $ε^i$ coming from unit $V_{21}$.

A store $M_4$ is made up of 7 shift registers having 23 bits each. In each case, the outputs of the last four bits are in parallel. The first six registers ($Q_1$ to $Q_6$ in FIG. 30) receives the 6 bits of $E'^i$, and the last register receives $p'^i$. In the case of this last register the 19th bit should have an input in parallel.

At signal $s'_5 = 1$ which follows zone $Z^i$ ($i = 0,1,..$ .)22, which is an imaginary zone if $i = 22$, word $E'^i$ takes up position 0 in the first six columns in $M_4$ and $p'^i$ takes up position 0 in the 7th column. At the same time, each register in $M_4$ is made up to execute a 1-position shift downwards, the bits in the $r^{th}$ position coming into position $r + 1$. As regards the output of store $M_4$, when signal $s'_5 = 1$ occurs, indicator $E'^i$ comes to position 21 in $M_4$, i.e. into the position before last; there is the exception to this rule when $i = 0$ and $i = 1$ when indicators $E'^0$, $E'^1$ appear at position 21 in response to signals $s_5^{21}$ and $s_5^{22}$.

It is as well to cancel read-out from the zones in which $M - E'^i > 14$. The comparison is performed in unit $V_{21}$ (FIG. 31) using the value $E'^i + 1$ which is extracted when this value is in position 19 in $M_4$. It gives rise to a signal $ε^i = 0$ or $ε^i = 1$ depending upon whether $M - E'^i < 14$ or whether $M - E'^i ≤ 14$. The number $p'^i$ which reaches position 19 in the 7th register in $M_4$ a time 19T later becomes $p''^i = 0$ if $ε^i = 0$ (it has not changed if $ε^i = 1$) and one has $p'^i - p''^i$. After signal $s_5^{i-2} = 1$, the 20 positions in the 6th first registers in $M_4$ contain the value of $E'^{i+1}$, the 21 positions contain that of $E'^i$ and 22 positions that of $E'^i -$. A definite framing signified by a fresh signal $p^i$, and the corresponding indicator $E^i$, are obtained by extending the framing to the zones which have none, which is accomplished in the following way: firstly, let $i$ be equal to 21 and not equal to 0:

1st case $p''^i=1$, one takes $E^i=E'^i$, $p^i=1$
2nd case $p''^i=0$, and $p''^{i-i}=1$ one takes $E^i=E'^{i-1}$, $p^i=1$
3rd case $p''^i=0$, $p''^{i-1}=0$, $p''^{i+1}=1$, one takes $E^i=E'λ^{i+1}$, $p^i=1$
4th case $p''^i=0$, $p''^{i-1}=0$, $p''^{i+1}=0$, one takes $p^i=0$.

When $i = 21$, $p''^{i+1} = 0$ and the rule is the same. When $i = 0$, $i - 1$ must be replaced by 22 and the rule still holds good on account of the imaginary zone which was introduced for this purpose.

These operations are carried out by means of gates $P_{76}$ $P_{77}$ and the four gates $P_{78}$, $P_{79}$, $P_{80}$, $P_{81}$ associated with each of the first six registers in $M_4$ (FIG. 30).

Locations 20, 21 and 22 in the registers have their outputs connected to the inputs of gates $P_{78}$, $P_{79}$ and $P_{80}$ respectively. To these same inputs are connected lines $r_{13}$ coming from gate $P_{77}$, line $r_{14}$ and line $r_{15}$ coming from gate $P_{76}$ respectively.

The first case. If $p''^i = 1$, line $r_{14}$ is at 1; gates $P_{79}$ are conductive and gates $P_{76}$ and $P_{77}$ are blocked and so that 6 gates $P_{78}$ and the six gates $P_{80}$ are blocked also: consequently, $E'^i$ is present at the outputs of gates $P_{81}$. 1 is obtained at output $p^i$ due to gates $P_{82}$ and $P_{83}$.

The second case. $p''^i = 0$ blocks the six gates $P_{79}$. When $p''^{i-1} = 1$, gate $P_{76}$ is conductive and $P_{77}$ is blocked, consequently the six gates $P_{80}$ are conductive whereas the six gates $P_{78}$ and the six gates $P_{79}$ are blocked. It is $E'^{i-1}$ which appears at the outputs of gates $P_{81}$. A 1 is obtained at $p'$, once again by means of gates $P_{82}$ and $P_{83}$.

The third case. $p'^i = 0$ blocks 6 gates $P_{79}$. $p''^{i-1} = 0$ blocks gates $P_{76}$. $p''^{i+1} = 1$ makes gate $P_{77}$ conductive, consequently, gates $P_{79}$ and $P_{80}$ are blocked whereas gates $P_{81}$ are conductive: it is $E'^{i+1}$ which appears at the output of gates $P_{81}$. $p^i$ is once again equal to 1.

The fourth case. Gates $P_{76}$ and $P_{77}$ are blocked, line $r_{14}$ is at 0 and gates $P_{78}$, $P_{79}$ and $P_{80}$ are blocked. 0 appear at the outputs of gates $P_{81}$. Gates $P_{82}$ and $P_{83}$ give $p^i = 0$.

The definite framing indicator $E^i$ is obtained at the output of gates $P_{81}$ while zone $z^{i-1}$ is being scanned. At the end of a zone signal $s_{19}^{i-1} = 1$, $E^i$ passes to the output of register $R_{15}$ (FIG. 30). If the column then being scanned is almost blank ($g = 1$) $E^i$ passes during the following period to the output of register $R_{16}$ and arrives at the input of the shifter $V_0$ shown in FIG. 4. If on the other hand $g = 0$, there is a character being scanned (or possibly a series of columns containing more than one blank which are not equivalent to a character); in this case, $E^i$ only passes to the output of register $R_{16}$ when $g$ first becomes equal to 1, by reason of the flip-flop $B_{49}$ which is reset to 0 at the next time T.

What still has to be specified are the means which ensure that there is not a readout in zone $Z^i$, dependent upon whether $p^i$ is 1 or 0. It is merely necessary to give the almost blank column signal each time $p^i = 0$ in a given zone.

Unit $V_{21}$ (FIG. 31) generates a signal $\epsilon = 1$ when $\lambda = 0$ and when $M - E'^i < 14$. For this the adder $A'_2$ receives the number M formed in unit $V_{19}$ and subtracts 14 from it (in fact it adds 64−14 = 50 to it). The result, which appears at the input to register $R'_{13}$ is transferred to the output of this register a period T after signal $Q_{43}$ and is present at an input of comparator $S_5$ for the whole duration of the following transverse sweep. After each zone, $S_5$ compares this value with that for $E'^i$ coming from $V_{17}$ and forms a 1 signal which makes $\epsilon = 1$ when $\lambda = 0$.

Unit $V_{21}$ forms the framing indicator E which will be used as a comparison during the following transverse sweep when read-out has taken place during the preceding transverse sweep. It is merely necessary to select the maximum value M of the indicators in this sweep. The signal $Q_{43}$, having been delayed by a time T, and the signal $\lambda^+$ which is formed at this time, are combined by gate $P_{84}$, activate register $R'_{14}$ and cause M to pass to the output of this register. Number $\bar{E}$ is thus supplied to $V_{18}$ to be used for the following transverse sweep.

The optical analyser described in the French Pat. No. 71.08646 above referred to is shown in principle on FIG. 32 and the complementary FIGS. 33 and 34 which show the trajectory of luminous rays. A wheel 101 in star-shape, turns around spindle 102, the points of the star forming by their faces a number of 2 — mirror groups, 103a and 103b set out at right-angles one from the other. This wheel, which ought to turn very quickly (at around 6500 rpm), is to be constructed of light metal, while the mirrors are obtained by the polished faces of the branches equipped with a reflective coating, for example in gold or in aluminum. The wheel ought to be manufactured with extreme precision in order to fulfil its role, because of the precision and the quality of scanning indispensible for microfilm characters. In turning they present successively the groups of 2 mirrors before an aiming zone and a zone of reflection of the luminous beam. In the aiming zone situated at the low part of the figure, a film 105 pushed against the outside curve of a transparent blade 104 is set out practically perpendicular to the range of the mirrors. The film being lighted from below (see FIG. 34) for example by a luminous point x, of the upper plane face of the blade 104, transmits an incidental beam which is reflected a first time by the face of the mirror 103a, a second time by the face of the mirror 103b and is thus directed downwards where a mirror 106, placed at 45° from the horizontal, picks it up and reflects it horizontally toward a lens 107. The 107 lens focuses the beam onto screen 108 which carries photo-sensitive elements transforming the luminous impressions into variations of electric current. The device lays out on screen 108, on a surface limited by a narrow fixed rectangle, the image of a very small rectangular luminous band picked up transversally in a uniform movement onto the surface of the film and according to its emergence of the 104 blade, which is easy to understand if one checks FIGS. 32, 33 or 34. On FIG. 33 where mirror 106 is not included, lens 107 provides, if one assumes the reverse return of the luminous rays, a virtual $S''$ image of point $S'$, the $S''$ image playing the role of virtual object in relation to the group of mirors 103a, 103b normal to the plane of the figure whose planes are cut up in I which is the projection of the spine of the dihedral angle formed by the mirror group. This mirror group provides an image x, which is symmetric to $S''$ in relation to point I. When one wishes to go across a distance $S_1$ to point x, $S_2$ corresponding to the printed width of film 103, is necessary that point I, thus the spine of the dihedral angle of the mirrors, travels distance $I_1$, $I_2$, which is half the distances $S_1$, $S_2$. If one refers to FIG. 34, which shows in perspective on the film scanned, no longer point x, but a tiny stick of light x, y, the light beam according to x y is to be seen by the mirrors in progressive shifting over the width of the film and projected by lens 107 onto a thin rectangular zone set on screen 108.

On FIG. 33 has been traced a rectilinear shifting of the spine of dihedral angle, but as it would be very difficult practically to set out very rapidly the groups of mirrors in a straight line, these are mounted on a wheel, with the necessary corrections for the trajectory $S_1$, $S_2$, that is equally curvilinear.

As will be seen more in detail below, the film which moves along according to the arrow F2 is supported by a 116 passfilm unit equipped with a light slot 118 which is crossed by a luminous flow Fx from a light chamber situated below. If the film has lines of writing such as A, B, C, D − G, H, I, J, (FIG. 34), the light slot 118 is provided to permit aiming zone x y to largely overflow the characters of one line. Going back to FIG. 32, one understands that the symmetric reflection at point S for a position of the group of mirrors is at a given moment, with pick-up mirror 106 and lens 107, only concerns a single band x y, while the other parts of the film lighted by the slot 118 are simply defracted or reflected in dispersion without concerning the sensitive zone of screen 108. As already mentioned, the spine A B of the dihedral angle of the mirrors describing a cylinder and the theroretical trajectory $S_1$, $S_2$ of the FIG. 33 is curved by the application of film on a transparent blade 104 whose opposite face from the axis of the wheel is a cylindrical surface.

Figure 36:
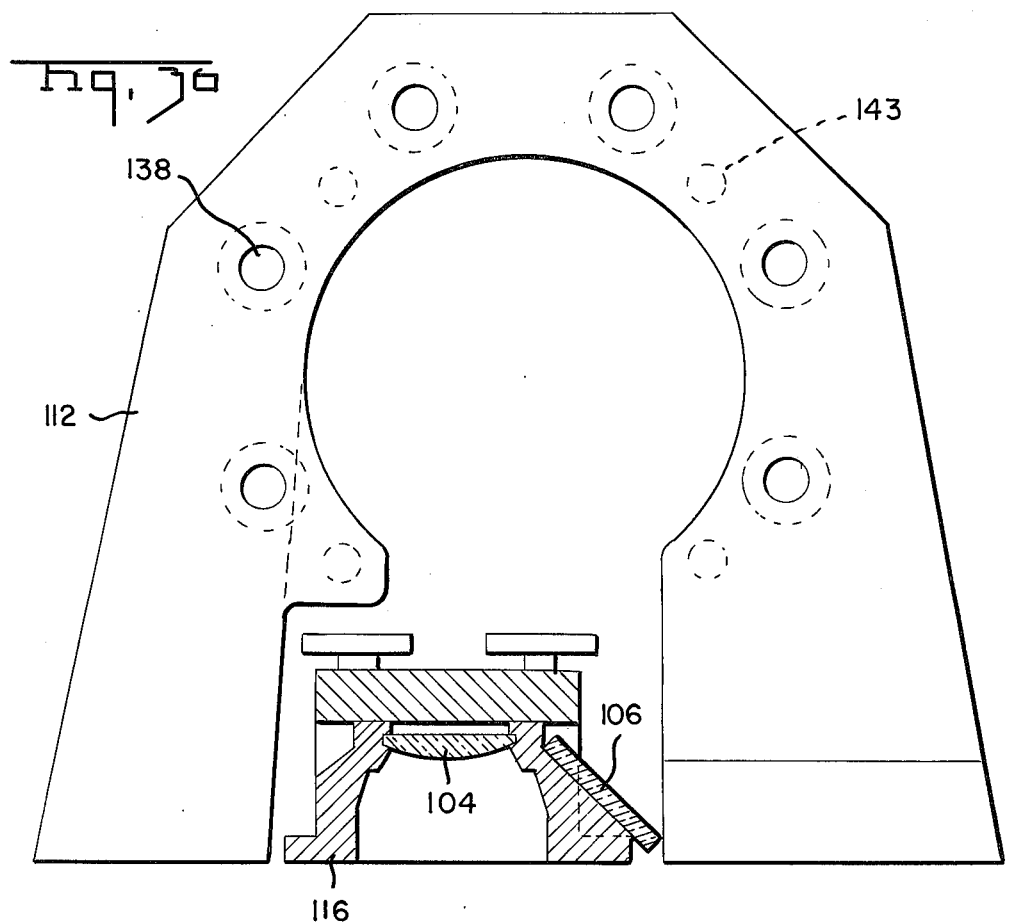
FIG. 36 is a front view, motor attachment side, of the support flange of the wheel-housing.

The general structure of the device is now to be described referring to FIG. 35. Wheel 1 should include a number of groups of mirrors chosen here on a 7-point star as a function of the dimensions and the speed of the wheel. Two mirrors 103a and 103b not being able to come together on one line, for reasons of construction, and the spacing 109 takes the place of the spine of the dihedral angle. Just the same, the points of the star cannot be sharp and end with a chamber 110. The wheel is enclosed in a housing 111 on the 114 cylindrical face, the housing being supported by a flange 112 set ridigly on the table 113 of the device (see also FIG. 36). The housing opens below by a large rectangular window 115 (see FIG. 37), which is closed by a leaktight glass thus insulating for the exterior the atmosphere of wheel shifting. The glass 115 is long enough to allow, according to the angle of scanning of the group of mirrors, the reception and the reflection of the scanning beam (see FIG. 38), that is to say a bit more than 2 times the width of the corrective beam where the film is applied.

A support unit 116 (FIG. 37 and FIG. 40), in which is embedded the corrective blade 104 is mounted under 115 resting on feet 116a on the table 113. At this unit, which separates off a lateral part destined under the window for the reception of the luminous beam, is backed-up a mirror 106 at 45° on the horizontal whose center is found at the vertical of the virtual point $S''$ already defined, this mirror being arranged to reflect the images to lens 107 which follows, the action, below the housing and attached also to table 113. Still on table 113 and following the lens 107, is placed at a convenient distance a microscopic lens to reduce the distance of projection in relation to the focal distance of lens 107 and to enlarge the film image. The microscope lens includes a mounting 125 and 2 lenses 126 and 127. A solid mounting 129, strongly tightened to the table 113 with bolts 130 made up of the screen 108 its face turned toward the lenses, this screen being equipped with photo-sensitive elements 128 the details of which are to be given below. The supporting unit 116 has a slot 118 (see also FIG. 34) which corresponds to the opening of table 113 to receive a luminous beam from mirror 119 situated below. The mirror 119 is tilted at 45° horizontal in the direction of the light source. To reduce the space occupied by the unit, the light source is placed vertically over the table 113 and on the same side as the reflecting part of the scanning beam. For that purpose a second mirror at 45°, 120, faces mirror 119 and its center 0 is at the vertical 00' of a bulb 123 placed at the center of reflector 122. The reflector 122 makes up the internal surface of a block 121, which is equipped with external coolers 123 and a filter 123a. The center of the reflector is pierced by a well 124 letting through the iodide bulb 123. This bulb is mounted on an adjustable socket 124 held in a support 125 integrated with the frame of the unit. The socket can turn within its support so that the direction of the filament of the bulb may be adjusted. The housing 111 is shown in cross-section on FIG. 37, the one for the wheel 101 and the ends of shaft 102 are carried by ball-bearings 131. The bearings 131 rest to one side in a lodging 132 of the housing and at the opposite side of the bore 133 of the cover 134 which closes the housing. A holding crown 136 screwed onto the cover 134 which is attached also to the housing by circumferential screws 137, presses the second ball-bearings group against the hub of the wheel 101, with the inter-position of the elastic joints 136. The housing is attached to the flange 112 by screws entering into the tappings 138 set on the check of the housing at the opposite side of its cover. The cover also is tapped 139 and receives a vacuum manifold 140, clearly, there is a partial vacuum in that manifold which diminishes the turbulence of the air which brakes the movement of the wheel in the housing, and also diminishes the noise. The mirror 115 at the lower part of the housing is a plate of silicium, thickness 1 mm held in the shoulders of the base of the housing by a closing plate 141 attached by milled-head screws 142. The flange 112 supports, also, has screws corresponding to the tappings 143 on the rear side, the drive motor. This motor drives the wheel via a flexible coupling, the attachment of the motor and of the coupling being conventional, they are not described in detail. The motor is monitored by electronic signals for speed. The analyzer device should be able to operate with great speed so as to scan for example 760 lines of writing on film per second which would have made it difficult to have a rectilinear alternating movement of the pair of mirrors. The pairs of mirrors have then been laid out on a wheel by adjusting the speed so that one pair of mirrors operates the scanning of a line of characters, another pair comes to take its place for reading the following line. So that the luminous beams may pass and taking into account the diameter of the wheel (which is as small as possible), the wheel should have seven pairs of mirrors. Their dimensions are ruled by the useful width of the film, for example 14 mm, and by the opening of the beam. For example, the circle radius covered by point $a$ of the spine of the dihedral angle is 20 mm and the distance from the center of the wheel to the outside edges of the mirrors is 40.6 mm. Contrary to the representation of the FIG. 33 the trajectory of point I of the spine of the dihedral angle and the trajectories $S_1$, $S_2$, are curves and remain parallel between themselves.

As already mentioned, the film is applied along the outside surface of a transparent cylindrical block and along a film length considerably greater than the distance $x\ y$ (FIG. 34), for example 10 mm. The film is held against the block by the rounded smooth spines which S holds it along the edges as explained elsewhere.

Another indispensible disposition is explained when considering anew FIG. 34. While the pencil of light seen by a pair of mirrors during a shifting goes across the film along a length L of the lighted band, the film shifts in a uniform movement in the direction of the arrow $F_2$. The medium line of the characters such as A, B, C, D, which are represented by Vo, Wo, shift in $V_1$, $W_1$. So that the relative position of segment $x\ y$ and of the characters remains constant, it is necessary to push pencil $x$, $y$, to drift progressively in the direction of the movement of the film. This is obtained in adjusting on the unit table the attachment of the spindle of the wheel in relation to the attachment of the film guiding unit so as to provide a light deviation in the parallelism of the spindles. For a film which advances interline 0.156 mm, the segment $x\ y$ should shift in a direction making an angle of 0.0112 radians perpendicular to the access of the film, this is in the example given of a wheel with 7 points which turns so that the scanning time of 1 line is a bit longer than double the idle time necessary so that the wheel will be ready to begin scanning the following line.

The adjustment of the precision of the wheel speed and of the film are assured by a quartz clock which also controls the electronic routing of the variations received by the photosensitive cells. The unit is intended for reading microfilm carrying characters with a thickness of lines of from 12 to 14 microns. For the proper functioning of the data processing device by the analyzer, it is necessary that each character crossed by the aiming pencil be submitted to a scrutiny of 21 parallel sections of the access of the film, since the precision of the reconnaissance across one line of characters requires a division by 35 perpendicular sections of this access on each line. The result is that the lines making up these characters are scanned by light disks tandem by about 4.69 microns from the diameter. So that this process of identification of characters in the electronic part of the unit operates with safety, one determines a maximum speed deviation in relation to the number of total scrutinies to be provided for a character. The relative error of the film advancement is corrected in the same manner, in relation to the number of luminous points and their position relative to the height of the characters. With a film holding 64 lines of 132 characters per centimeter, the speed of 100.000 characters per second corresponds to 117 mm/second.

Figure 38:
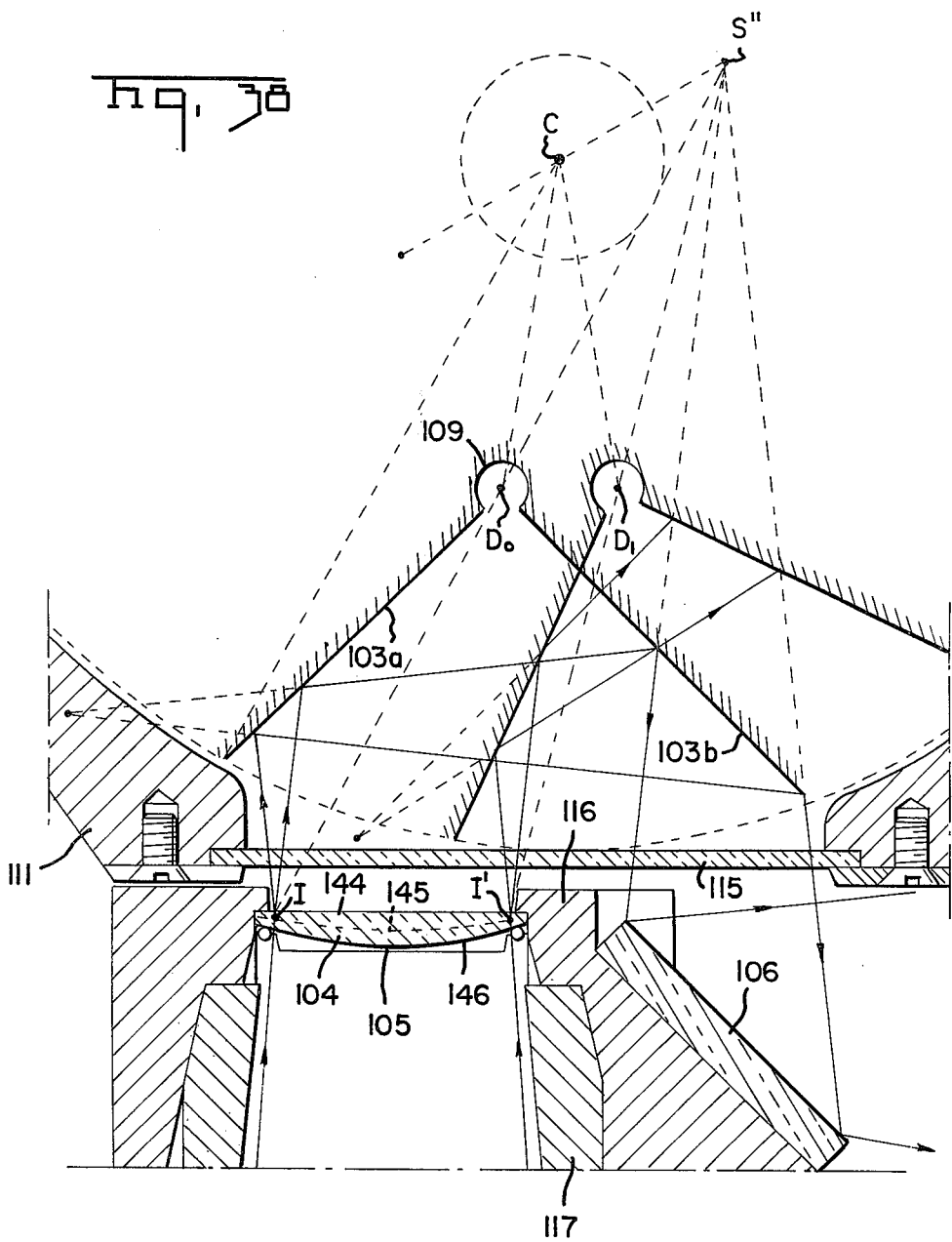
FIG. 38 is a cross-section according to a transversal plane of a couple of mirrors with the trajectory of the luminous rays.

FIG. 38 shows in more detail the trajectory of the light rays along the film, the mirrors and the zone of pick-up of the rays, the trajectory being the transcription of FIG. 33 in the case of the cylindrical driving of the mirror pairs. The film 105 slides perpendicularly to the plane of the figure against the curved face 146 of the blade 104, being pressed according to its edges by the ribs of a film-press unit 117. The transparent unit is mounted in the film guide 116, which has a central cavity 147. Since this appears better in the plane view of the film guide (FIG. 39), the slot 118 of light is at the center of unit 116, and the lower part of the unit forms a tunnel 150, leaving the width of the passage of film against the correcting blade 104. The unit 116 equipped with lateral feet 149 for attachment by screens passing in the holes 148 drilled in the feet. The unit 116 carries laterally in its center the mirror 106 conveniently inset in the mass following a 45° angle. The correcting blade 104 itself made up of lens which forms a diopetre with the film, in such a way that the image found on the film is transmitted virtually onto an internal surface of the lens, shown on the crossed section following line I, I' (see FIG. 38). It is then this curved line I, I' which plays the role of $S_1$, $S_2$ of FIG. 34 and the construction will cause the virtual point S'' to find itself symmetrical to I, I' in relation to points Do and $D_1$ which mark the position of the spine of the dihedral angle of the mirrors at the beginning and at the end of the scheduling of a line of film. Note that the mirror 103a at the beginning of the scanning is placed in position at 45° on the vertical to see normally point I, thus it is only at the beginning that the medium plane of the pair of mirrors is normal on the surface of the blade 144. After one rotation of the wheel of 20°03', the mirror 103a is in reading position at the end of the line in I$^x$. The beam reflected on the mirror 106 is constant and normal at the window 115 of the housing. The position of the surface 146 of the unit 104 is determined by the exact position of the I, I' which itself depends on the refractivity of the environment crossed. Since the film emulsion is placed below to avoid wear, one takes into account the two indexes of the blade and of the film.

Figure 42:
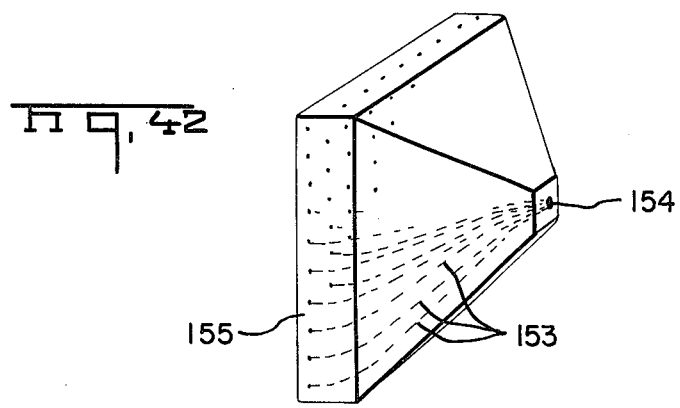
FIG. 42 is a view of the fiber-optics enlarger.
Figure 77:
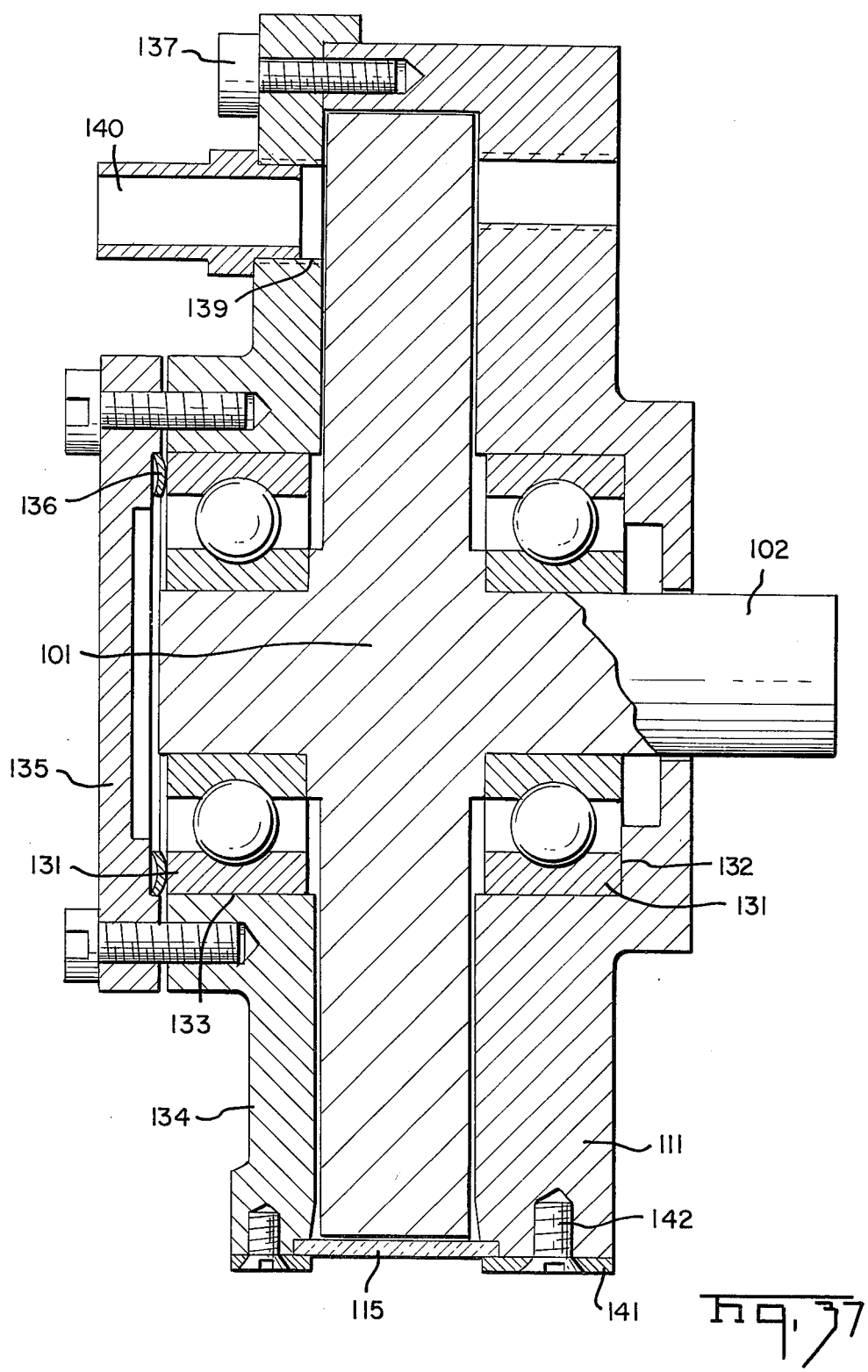

To push the film 105 correctly against the surface 146 of the blade 104, the presser unit 117 is adjusted by a special blocking device of unit 116 which contains it. Unit 117 (FIG. 47) is crossed in its environment by a slot of light 18° corresponding to the slot of the film-guide. It is equipped on its upper plane surface 151 with two sets of ribs 152a, 152b, which are made up of silicium wires bonded to the unit. Thus, the wear of film pressed by the edges is reduced to a minimum. The photosensitive elements 128 shown in FIG. 35 ought to be of a number and of dimensions appropriate to correspond to the precision of the analysis of the beam picked-up on the film and transmitted by the device. Taking into account the lenses chosen, the photosensitive receivers are to be ranged in line from 81 to 96 elements. The enlargement obtained by the microscope lens if it is included between 25 and 100 allows the use of receiver elements of 0.125 to 0.500 mm. One can also use a unit of fiber optics conducting light 153 (FIG. 42) situated on the same plane at the beginning and tightly joined 5 microns from access to access approximately, the starting surface 154 being thus very small, while the arrival surface 155 is enlarged and can use various receivers.

The photoreceivers can be photo-diodes, photo-transistors or photo-multipliers. In the case of photo-diodes or photo-transistors. The best solution consists of choosing the elements of a diameter such that the luminous flow which they receive is equal to the maximum which they can support without over-heating. If one fixes at 100 to 200 W the input power onto the lighting filament, the diameter of the photo-elements is thus defined. An essential condition is that the photo-element chosen be rapid enough to obtain the significant pick-ups at the T time intervals. Actually, the analysing devices intended to feed a data processing device which, usually functions numerically by clock pulses. The luminous impressions reflected ought to be cut-up, that is to say that one scrutinizes these characters analysed from microfilm. In relation to the size and to the dimensions of the lines making up the characters, it has been estimated that one should make a minimum of 21 scrutinies per character, that is in intervals of time T of 185 nanoseconds for the 100.000 characters per second which it is proposed to read. It is necessary for that that the photo-receiver, when it passes from darkness to light arrives at 9/10 of its throughput in 100 nanoseconds at the most, and that it goes down to 1/10 of its throughput in 100 nanoseconds at the most when it passes from light to darkness. Such photo-receivers exist in the form of photo-diodes UDT in bands of 100 elements. One must add to these photo-diodes operational amplifiers represented in 155 and 156 on FIG. 35, these devices being mounted on a support 157.

Another solution consists of employing around 100 photo-multipliers. The advantage of these is a greater sensitivity which situates itself along the shorter waves, maximally toward the green instead of toward the close infra-red, which gives finer images. Their price would be compensated by the economy of the amplifiers. In this case, the dimensions of these elements oblige one to use a fiber-optics device such as is shown on FIG. 42.

It is understood that the invention is not limited to the embodiment described. The recognition or identification system described may also be used to produce an automatic reader whenever the text carried by the document and the scanning device meet the specified requirements.

The system is specifically designed to achieve a very high speed and security in use. Generally speaking, the reading speed will be limited only by that of the scanning device. The system described is particularly advantageous where the texts are made up from very small characters, such being the case with 16 mm microfilm. In this case scanning can be undertaken in the desired conditions at a speed comparable to that which the system described can achieve. It is possible, with, for example, a microfilm produced from a magnetic tape by means of commercially available apparatus, to scan at a speed of approximately 100,000 characters per second using the apparatus which form the subject of the French Patent Application 71.08646 hereinabove referred to.

While preserving the possibility offered by microfilm of storing information in a very small space and of allowing it to be read by means of an enlarger, a system of this type enables the information to be fed back rapidly to a computer. This feeding operation may be either direction or via a magnetic tape, the magnetic tape being then identical to the tape from which the microfilm was produced. A system of this type would enable the contents of an average volume of 300 pages to be read in approximately 10 seconds.

I claim:

1. A system for scanning and identifying characters in a document carrying a text made up of equidistant parallel lines of equal length placed one below another, some lines possibly being blank, the said system including means for scanning the text in successive transverse sweeps during each of which a transverse band covering a small number of lines of writing is scanned, the document being movable relative to the fixed position of the band so that, between one transverse sweep and the next, each line of writing comes into substantially the same position as the line before, each band being itself scanned at a frequency T in J equidistant columns, each of said columns being divided into a number N of small areas which form a line, the said scanning means supplying N electrical signals formed by a 0 or a 1 which correspond respectively to the whites and blacks or vice versa in the text, the system being characterised by the combination of means for extracting from each of the successive bands the signals corresponding to one line of writing in such a way that each line is extracted once and once only, means for extracting from each of the columns J in the band an interval containing a fixed number N' of bits which forms a part-column G such that each column G extends over the whole height of the selected line of writing, a progressive store comprising N' shift registers in which each bit moves up one position after each time T, means for feeding the part column G into said store, means to discover, for each of the characters encountered, which is the first and last of the columns G associated with this character before the said columns are fed into the progressive store, means for extracting for each character in the selected line of writing, a small number of columns from the columns G which cover the character, this number being calculated as a function of their total number and being intended for the identification of the character; a first group of registers and means to transfer the respective columns $G_1$, $G_2$ to them in parallel from said progressive store, a second group of registers and means to transfer the contents of said first group of registers to said second group of registers in parallel so as to free the latter which then receive the columns selected for the next character, which are selected in their turn from said progressive store, said registers in said second group being so arranged that means allow the length $A_j^i$ of the part intervals $I^i1$, $I^i2$ . . . making up each of the columns $G^i$, which are expressed as number of bits and which are formed from consecutive whites or consecutive blacks, to be extracted from them, so as to correct for possible spots or missing areas, means for comparing these lengths with predetermined fixed numbers $C^i_{j1}$ $C^i_{j2}$ . . . , the said comparison means being arranged to allow one or more inequality tests which compare the lengths $A_j^i$ with these fixed numbers $C^i_{jm}$ to be associated with each of the characters я in the alphabet employed, so that, if the inequality conditions of one of these tests are satisfied in the case of an unknown character the latter is thus identified with я , the said means enabling a length $\Lambda_j^i$ to be compared with $C_{j,1}^i$, $C_{j,2}^i$ . . . , each time such a length is ascertained, in a time which is sufficiently short for the said means to be again usable when length $A_{j+1}^i$ appears no matter how short this length may be, it also being possible for the comparisons for columns $G^1$, $G^2$ . . . to be carried out simultaneously, an identifying member incorporating an input device made up of locations corresponding to the indices $i, j, k$ of the constant $C_{j,k}^i$, which each receive the result of a comparison in the form of an 0 or 1 bit as soon as the comparison has taken place, said identifying member further incorporating one or more output registers each of which is made up of locations corresponding to the different characters in the alphabet in question and means which use the inequality tests which have been associated with each character so that the character which is identified is indicated by a 0 (or a 1) at the location which corresponds to it and by a 1 (or a 0) at all the other locations in each of the output registers, this character being considered a valid one where the identifying member has only one output register, or, where the identifying member has a plurality of output registers, the inequalities employed for each of the characters calling into play pairs of indices which are generally different from one register to another, identification being considered valid if all the output registers of said identifying member indicate the same character or if this character predominates and means for supplying the characters so identified in the form of coded signals.

2. A system according to claim 1, wherein code means are provided which are suitable, when two different characters and not one satisfy the inequality conditions formed, to indicate this occurrence by emitting a special code which signifies character not recognised.

3. A system according to claim 1, wherein, in order to determine which part columns G cover a character, a column which contains only one black bit or only a small number of black bits is ignored.

4. A system according to claim 3, wherein generating means are provided for generating a special code at their output when successive columns G occur which are recognised to contain sufficient blacks as set forth in claim 3, which contain too many to represent a character.

5. A system according to claim 1, wherein said line-framing members are arranged to carry out two simultaneous operations in the course of one of the transverse sweeps of the text, in general, namely, on the one hand, the identification of the characters in one of the lines of writing L wholly contained within the band and, on the other hand, the use of the signals originating from the next line of writing L$^+$, all or part of which appears in the said band, in order to determine which are the parts G of the columns in the next transverse sweep which should be used for framing and reading line L$^+$, the position of the lowest bit in G less one unit being the framing constant.

6. A system according to claim 5, wherein the line framing member is arranged to allow the framing constant intended for use during the next transverse sweep to be determined a plurality of times during a transverse sweep so as to reduce the errors which would result from the lines of writing on the one hand not being perfectly straight and on the other hand forming a slight angle with the direction in which the document is scanned trasnversely, the transverse sweep across the latter being split up into zones $Z^1$, $Z^2$ . . . each of which has a framing determined for it, reliance thus being placed on the fact that, for any zone in the same position the framing will vary only slightly from one transverse sweep to the next.

7. A system according to claim 6, wherein the line-framing member is arranged to allow a work $M^i$ termed the profile of a zone to be obtained during a transverse sweep for each of the zones $Z^i$, the word being obtained as follows: the bit in it in position $n$ represents a black (or a white) if and only if one of the bits in the same position starting from the bottom in the columns J in the zone represents a black, the columns J possibly being restricted at the top for this operation, and the profile so obtained being used to determine which is the framing constant to be used for zone $Z^i$ during the next transverse sweep.

8. A system according to claim 6, wherein the line-framing member is arranged to allow at least one isolated white between two blacks, or at least one isolated black between two whites in the word $M^i$ to be ignored when obtaining the framing for zone $Z^i$ from word $M^i$.

9. A system according to claim 5, wherein the line-framing member is so arranged that, when reading is expected during a transverse sweep, determining the framing for the next transverse sweep may bring into play one of the framing constants obtained during the preceding transverse sweep.

10. A system according to claim 6, wherein the line-framing member is so arranged that, when a zone $Z^i$ has not caused a framing to be obtained in the course of a transverse sweep during which line L is identified due to the fact that no character of normal height has appeared in the next line $L^+$ during the transverse sweep, the device allots to $Z^i$ the indicator obtained for a contiguous zone, which is carried out because zone $Z^i$ may contain parts of characters or low characters such as full stops or commas in line $L^+$.

* * * * *